(12) United States Patent
Tanner et al.

(10) Patent No.: US 11,930,159 B2
(45) Date of Patent: Mar. 12, 2024

(54) METHOD AND SYSTEM OF VIDEO CODING WITH INTRA BLOCK COPYING

(71) Applicant: Intel Corporation, Santa Clara, CA (US)

(72) Inventors: Jason Tanner, Folsom, CA (US); Zhijun Lei, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 956 days.

(21) Appl. No.: 16/699,243

(22) Filed: Nov. 29, 2019

(65) Prior Publication Data

US 2020/0099926 A1 Mar. 26, 2020

(51) Int. Cl.
*H04N 19/105* (2014.01)
*H04N 19/119* (2014.01)
*H04N 19/142* (2014.01)
*H04N 19/176* (2014.01)
*H04N 19/426* (2014.01)

(52) U.S. Cl.
CPC ......... *H04N 19/105* (2014.11); *H04N 19/119* (2014.11); *H04N 19/142* (2014.11); *H04N 19/176* (2014.11); *H04N 19/427* (2014.11)

(58) Field of Classification Search
None
See application file for complete search history.

(56) References Cited

U.S. PATENT DOCUMENTS 9,875,552 B1 * 1/2018 Savage .................. H04N 19/51
2016/0277733 A1 * 9/2016 Li ........................... H04N 19/96

\* cited by examiner

*Primary Examiner* — Kaitlin A Retallick
(74) *Attorney, Agent, or Firm* — Essential Patents Group, LLP

(57) ABSTRACT

Methods, articles, and systems of video coding use intra block copying with hash-based searches.

14 Claims, 12 Drawing Sheets

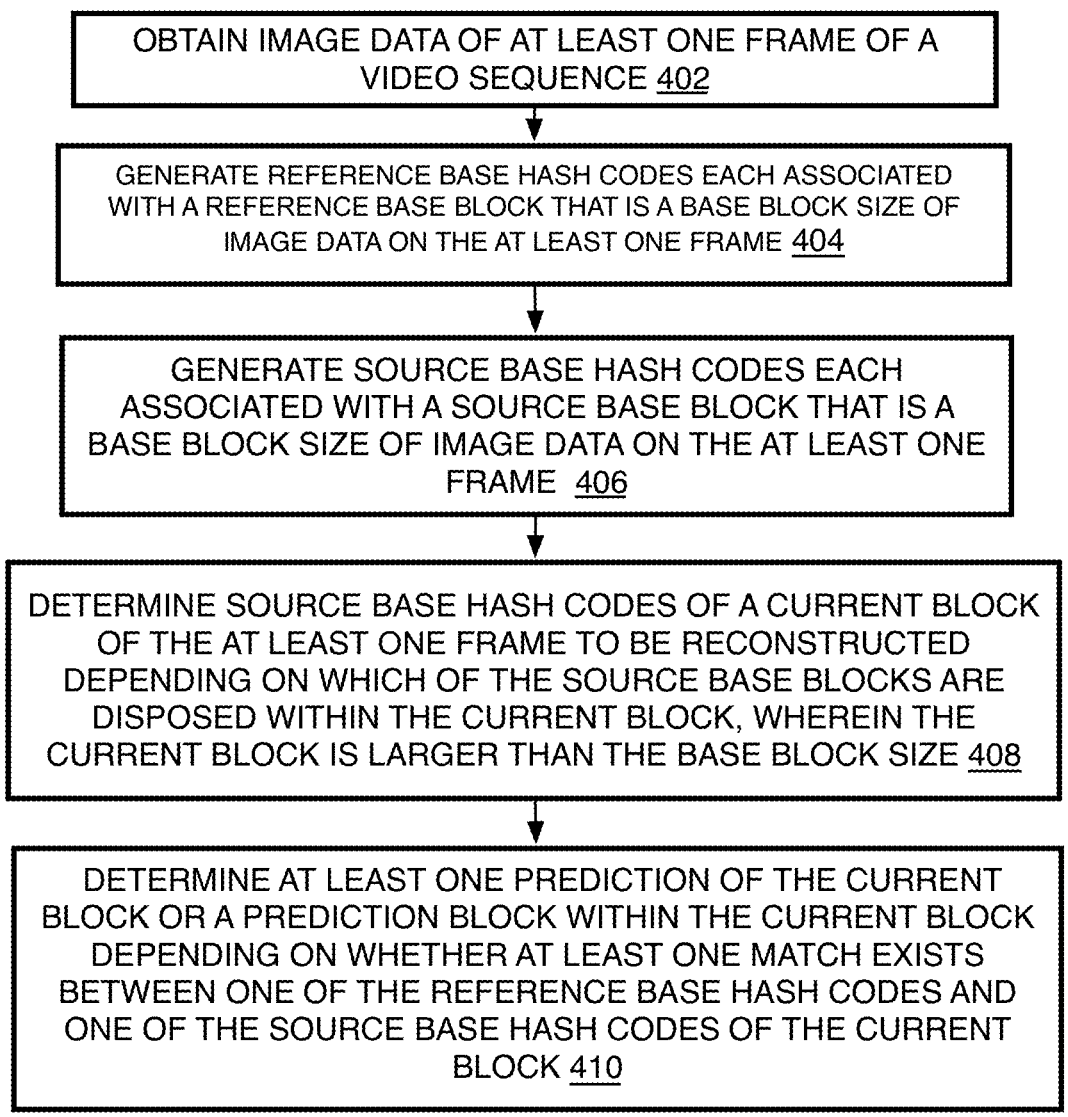

- Obtain image data of a frame of a video sequence 502
- Pre-process frame 504
- Generate reference hash codes of reference base blocks to form reference frame 506
  - Create Ref. Hash Table 508
  - Create reference hash entries 510
    - Compute reference base hash code for individual base blks 512
      - Obtain image data of base blocks base block by base block 514
      - Form base blocks and reference base hash codes for previously encoded reference frame portion 516
      - Compare hash code to neighbors to find uniform regions 518
      - Maintain at least count of region size(s) 520
  - Place reference hash codes on table 522
- Generate source hash codes of base blocks of frame 524
  - Divide frame into non-overlapping base blocks 526
  - Obtain source base hash codes of base blocks 528
- Obtain location of first current block to be reconstructed 530 ← C
- Determine which source base blocks are disposed within the current block 532
- Obtain source base hash codes of the source base blocks within the current block 534

| $H_{4x4}$ (0,0) | $H_{4x4}$ (1,0) | $H_{4x4}$ (2,0) | $H_{4x4}$ (3,0) | $H_{4x4}$ (4,0) | $H_{4x4}$ (5,0) |
|---|---|---|---|---|---|
| $H_{4x4}$ (0,1) | $H_{4x4}$ (1,1) | $H_{4x4}$ (2,1) | $H_{4x4}$ (3,1) | $H_{4x4}$ (4,1) | $H_{4x4}$ (5,1) |
| $H_{4x4}$ (0,2) | $H_{4x4}$ (1,2) | $H_{4x4}$ (2,2) | $H_{4x4}$ (3,2) | $H_{4x4}$ (4,2) | $H_{4x4}$ (5,2) |
| $H_{4x4}$ (0,3) | $H_{4x4}$ (1,3) | $H_{4x4}$ (2,3) | $H_{4x4}$ (3,3) | $H_{4x4}$ (4,3) | $H_{4x4}$ (5,3) |
| $H_{4x4}$ (0,4) | $H_{4x4}$ (1,4) | $H_{4x4}$ (2,4) | $H_{4x4}$ (3,4) | $H_{4x4}$ (4,4) | $H_{4x4}$ (5,4) |
| $H_{4x4}$ (0,5) | $H_{4x4}$ (1,5) | $H_{4x4}$ (2,5) | $H_{4x4}$ (3,5) | $H_{4x4}$ (4,5) | $H_{4x4}$ (5,5) |

FIG. 7A

METHOD AND SYSTEM OF VIDEO CODING WITH INTRA BLOCK COPYING

BACKGROUND

A number of video coding standards use specialized techniques to encode synthetic video or synthetic screen content that is different than video captured by a camera. Such screen content may include text on typical office-based applications such as word processors, power points, spread sheets, and so forth. Other screen content with large flat or uniform regions that is often different than camera captured video may include animation, games, and so forth. Also, it is often desirable to perform screen sharing with such content for video conferences or projection to larger screen TVs or monitors such as with personal area networks (PANs). Since such synthetic screen content has large amounts of repeated flat (or uniform) image data that moves in relatively large segments and in relatively large distances from frame to frame versus that of video captured by a camera, it has been found that video coding of such synthetic screen content can be performed differently than that used with captured video to increase performance and/or quality. One example of such a codec is the screen content coding (SCC) extension of high efficiency video coding (HEVC). The known SCC video coding techniques, however, often involve overly large computational loads that can decrease performance and consume too much power. Conventional techniques to reduce the computational load often increase performance by sacrificing too much quality, especially with SCC intra-prediction video coding techniques such as hash-based searching for intra block copying (IBC).

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate the corresponding or analogous elements. In the figures:

FIG. 4 is a flow chart of a method of video coding with intra block copying according to at least one of the implementations herein;

FIGS. 5A-5C is a detailed flow chart of a method of video coding with intra block copying according to at least one of the implementations herein;

FIG. 6 is a schematic diagram of anchor pixel locations for reference base blocks on an image according to at least one of the implementations herein;

FIG. 7A is a schematic diagram of an image showing reference base blocks of a flat, uniform region according to at least one of the implementations herein;

DETAILED DESCRIPTION

Figure 1:
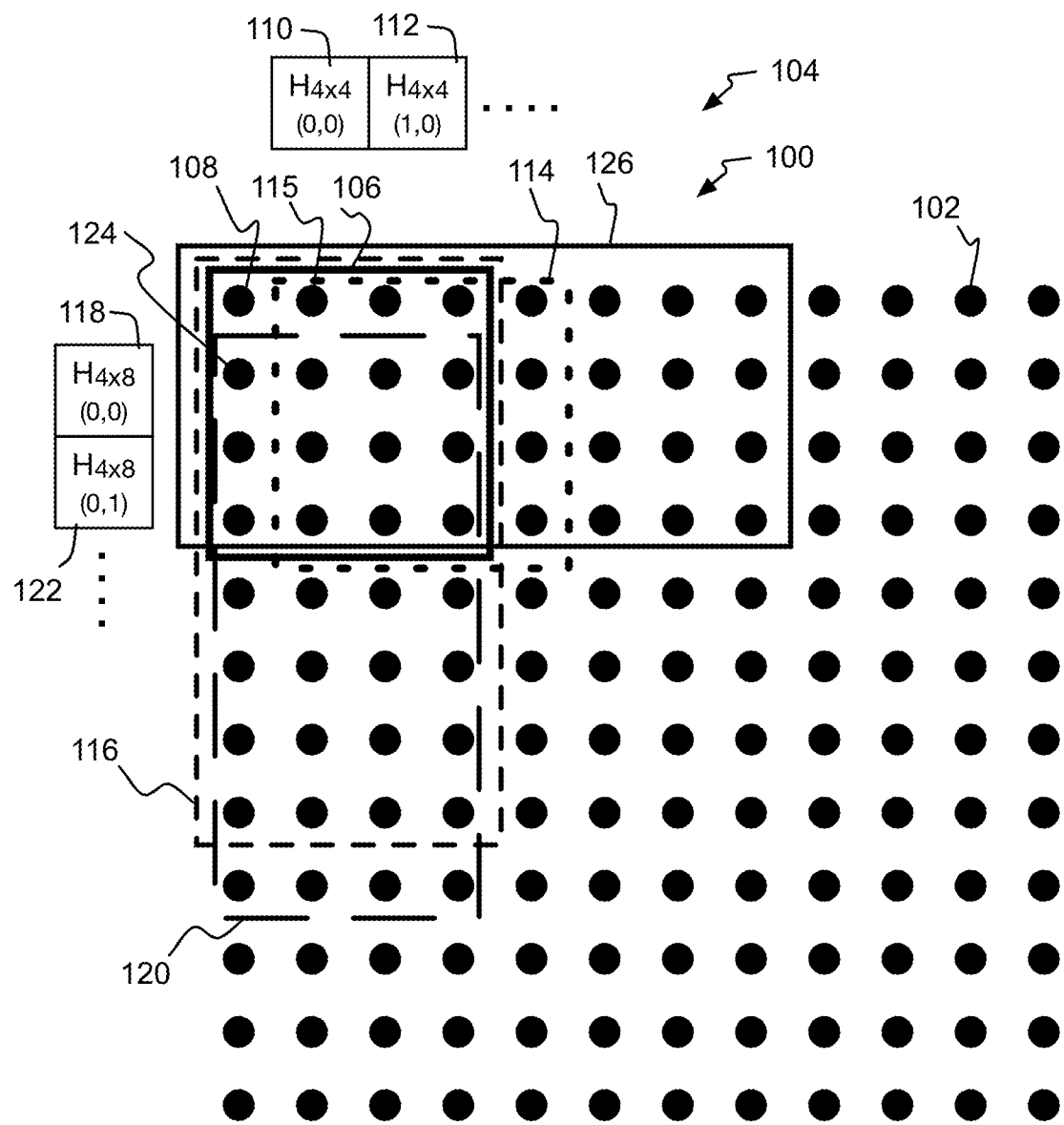
FIG. 1 is a schematic diagram of an area of an image showing alternative prediction block sizes for coding prediction.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless specifically specified herein. For instance, various architectures employing, for example, multiple integrated circuit (IC) chips and/or packages, and/or various computing devices, commercial electronic devices such as servers, and/or consumer electronic (CE) devices such as computers, set top boxes, smart phones, televisions, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods are described below related to video coding with intra block copying according to at least one of the implementations herein.

As mentioned, a number of video coding standards such as high efficiency video coding (HEVC) have specialized operations to handle screen content coding (SCC) rather than, or in addition to, recorded video. Specifically, an HEVC-SCC extension provides additional intra-prediction modes in the form of an intra block copy (IBC) technique that uses hash-based intra searching to match previously encoded blocks on a frame with a current block being reconstructed on the same frame.

Particularly, an IBC mode copies previously reconstructed entire blocks on a frame to other locations on the same frame. This block copying has been found to be sufficient because of the typically more flat or uniform nature of the synthetic screen content. The selection of the block for copying is similar to video inter-prediction except here a search for a matching block and resulting block motion vector is determined on the same frame. Also, the matching should be more precise than that provided with video inter-prediction where blocks may be compared by determining the least average or sum of absolute differences (SADs) between the pixel data on a block of a reference frame and the original pixel data of a current block being reconstructed. Such grouping of pixel values to represent a single block is often inadequate for synthetic images since it is too imprecise when many synthetic objects in screen content, such as a small part of a single letter when text is displayed on the image, can be less than a single block.

To overcome this imprecision issue, IBC performs a hash-based search where each block of an image is provided with a hash because a hash can change depending on small changes of pixel image data in a block. The hash, or more particularly a hash code or value, is a generic way to convert a series of data into a fixed size value. A number of different ways exist to compute a hash code such as by using a cyclic redundancy check (CRC) calculator or using a XOR operation on individual double words (DWORDs) of an input data series to name a few examples. More complicated algorithms, such as MD5, also can be used.

Since a block of pixels can be used to create a hash code that is unique to that sequence of pixels in the block, the hash algorithm guarantees that different input data will generate different hash codes so that comparing two hash codes generated from two data series indicates whether or not the two data series are exactly the same or not. Thus, once the hashes are generated, a reference hash of a previously encoded reference block on the frame is compared to a current source block hash of a current block being reconstructed on the same frame to determine if the two blocks are an exact match. If the hashes are the same, then the image data of the reference block is used as the reconstructed data of the current source block.

Referring to FIG. 1, more difficulties arise when balancing performance and quality because large computational loads are often needed to implement the hash-based searching. Specifically, video frames are often divided into multiple alternative square or rectangle prediction blocks with different sizes for the same area of a frame and during inter and intra prediction encoding. Each different size block is an alternative prediction candidate that is compared to other prediction candidates with different block sizes of the same pixel area on an image. For example, and for an area 100 of pixels 102 on an image 104, the pixel area 100 may be divided into 4×4 pixel blocks including a 4×4 pixel block 106 extending downward and to the right from an anchor pixel location [0,0] 108 which is the upper left corner pixel location of block 106. A hash code $H_{4\times4}$ (0,0) 110 may be calculated based on the sixteen pixel values in the 4×4 block 106. Similarly, a hash code $H_{4\times4}(1,0)$ 112 may be calculated based on the sixteen pixel values in a 4×4 block 114 extending from anchor pixel location [1,0] 115 where block 114 is shifted over one pixel column to the right from block 106. This is repeated so that each pixel location 102 acts as a block anchor pixel location to generate a hash code for the 4×4 pixels extending right and downward from the anchor pixel location. This arrangement provides a hash code for all possible overlapping 4×4 block locations within an area of an image or for the entire image. This is often repeated for both the reference frame(s) as well as the current source frame that is being reconstructed. Note that the terms image, frame, and picture may be used interchangeably herein unless the context indicates otherwise.

Then as another option frequently used by encoder prediction schemes, the same hash computation may be performed for each of the different block sizes that will be considered to form intra prediction candidates. Thus, for example as another intra mode candidate, the pixel area 100 may be divided into 4×8 prediction blocks and for a 4×8 pixel block 116 starting from the upper-left corner anchor pixel location [0,0] 108 again, a hash code $H_{4\times8}(0,0)$ 118 may be calculated based on the 32 pixel values in the 4×8 block 116. Similarly, a hash code $H_{4\times8}(0,1)$ 122 also may be calculated based on the 32 pixel values in a 4×8 block 120 extending from an anchor pixel location [0,1] (124) that is one row down from the anchor pixel location 108 of block 116. As another example, 8×4 blocks 126 also may be provided as with the other blocks. This also may be repeated with each pixel 102 acting as an anchor pixel to define a block of pixels to use to compute a single hash code. This could be repeated for all possible available intra-prediction block sizes such as 4×4, 4×8, 8×4, 8×8, 8×16, 16×8, 16×16, and so forth usually in increments of 4 or 8 pixels in block dimensions and up to 64×64 coding tree units (CTUs) for HEVC for example. To provide the hash-searches for all of these alternatives, multiple buffers are often used to support all available block sizes and shapes. Thus, each block size and shape combination (also referred to as a prediction unit (PU) size) may have its own buffer (or memory location), and each buffer may store a calculated hash code for each anchor pixel location for that particular block size and shape combination. As mentioned, this process is often carried out for each frame that is to have alternative intra-prediction candidates on both the reference frames and the current frame being reconstructed.

After dividing the frames into blocks and obtaining the hashes, and in order for the encoder to select the best alternative encoding mode from among the different block shape and size candidates, the encoder often supports both hash-based intra block copy search and alternatively a normal motion search. A motion search may use a SAD comparison similar to inter-prediction, for example, instead of using a comparison of hashes. The hash value for different block shape and/or size candidates and each search point is often generated in advance of the IBC search process to find matching blocks. Performing all of these operations requires a very large amount of memory capacity, memory transactions, and time to perform the storage of all block alternatives.

By one conventional form, a separate hash table may be provided for each different size of block. For each current source block of the current frame to be predicted, the alternative differing prediction unit (PU) size hash values of the current block are calculated and checked to find a corresponding entry in their respective hash tables depending on the block size. If there is a match, intra block copy is often most likely used as the intra mode candidate for the current block. If there is no match, then other encoding modes are used. This approach requires a large amount of processing, and in turn power consumption, to calculate alternative hash codes for different block sizes in addition to the large amount of memory buffers and bandwidth needed for storing and accessing the hash codes.

Also, while this conventional software technique tends to be more exhaustive since it checks all prediction block sizes separately, the conventional IBC does not balance performance with quality properly because it does not track and identify multiple blocks that form flat, uniform regions where hashes can be duplicated on the hash tables and other settings could be refined when a flat, uniform region on the image is detected. Such flat, uniform regions have substantially the same image data values such as the same color and brightness values, or at least both the color and luminance values are considered sufficiently close such that the human eye does not notice a significant difference and merely sees a single color and/or brightness. Hereinafter, this will be referred to as a uniform region.

Finally, the conventional IBC cannot be used effectively on natural camera-captured video because the noise and small pixel-level variant gradients that are often insignificant and unnoticeable to the human eye can prevent matches in hash comparisons when source and reference blocks have image data that is sufficiently close for intra prediction. Thus, an encoder cannot take advantage of any efficiencies provided by hash comparisons when natural video is being encoded.

To resolve these issues, the disclosed method and system compute reference hash codes for base blocks of a base block size and of a current frame being reconstructed. The base block size may be the smallest block size, or other selected size, available for prediction mode candidates during encoding, such as 4×4 or 8×8 blocks, rather than having hash codes computed for all alternative block sizes. The base block size cannot be the largest prediction block size available by the encoder. The computation of hash codes is performed for both reference base blocks forming a reference frame of original image data on the current frame as well as for source base blocks for comparison.

Specifically, the method determines which source base blocks form, or fit within, a current source block being reconstructed on the current frame. The source base hash codes associated with the source base blocks forming the current block are compared to the reference base hash codes to determine if any of them match. This base block hash code matching can be performed in a number of different ways. By one form, the reference base hash codes may be stored in a list, table, or library while the source base hash codes are computed on the fly as needed. By one approach, the source base hash codes associated with source base blocks that are found to fit within a current block being reconstructed are looked-up in the reference table or list to find matching hash codes, and in turn matching reference base blocks. This is referred to as the direct look-up search option herein. Instead, by a concatenation alternative approach, the source base hash codes are concatenated into a single current or source hash code for the current block and that is matched to a reference hash code formed by concatenating the reference base hash codes from reference base blocks that cooperatively form the size of the current block. In this case, the system looks-up the reference base block locations of the base blocks that fit within the current block in the reference table to find the reference hash codes of those reference base blocks. The concatenated source and reference hashes are then compared for matching. The method also may generate predictions for prediction blocks within the current block by either the direct look-up search option or by concatenating the source and reference base hash codes to form, or fit in, the prediction blocks as with the entire current block.

With this arrangement, the hash-searching method can either determine whether the image data of the entire current block can be matched by image data of the reference base blocks, or whether the image data of any smaller available prediction block sizes within the current block are matched by the image data of one or more base reference blocks. This avoids the numerous hash code computations for all alternative block sizes, thereby reducing the computational load and power consumption for the hash-based searching as well as reducing the memory capacity and memory transactions needed for the hash-based searches. The image data of the hash-matching reference block(s) can then become the image data of an intra-mode prediction candidate (or just prediction), or one of the intra mode candidates, for the current block, or prediction block within the current block, being reconstructed. By alternative forms, the matching reference block(s) could be used as a start point for an IBC normal motion search. The reduction of redundant hash areas by the use of base block size-level hashes and alternatively the non-hash hierarchical block matching when needed reduces storage bandwidth and reduces storage requirements by about at least 25%. It also reduces hardware requirements for generating the hashes because a hash generator, whether by dedicated hardware or CPUs, for a single hash size can be very efficient compared to a generator for multiple hash sizes, which would slow the process due to additional computations to form hashes for larger blocks. Otherwise, parallel generators would be needed for different sizes to avoid delays.

In addition, the disclosed method may maintain a count of neighbor base blocks that have the same hash code as a current block adjacent the neighbors, and therefore, indicate the extent of uniform regions on the image being reconstructed. When the hash codes are found to be the same, a region id count may be incremented. The region id and count of the same hash code may be maintained on a separate table or on the reference hash table. The encoding then can take advantage of the knowledge of such uniform region to increase quality and reduce computations and delay in many ways as follows.

First, such uniform source blocks with the same hash code can be assigned a lower QP when the coder finds that the source block is part of a common flat area with neighbor base blocks on the current frame and/or was part of a common uniform region from a previous frame. Lowering the QP raises the quality (or reduces distortion) of the source blocks although it does raise the number of bits (lowering the bitrate) and computations for each of these uniform blocks. However, the coder can compensate for such extra bits due to increased compression from copying the same image data from among the source blocks forming the uniform region as well as by blocks on future frames that refer to the flat uniform region for reconstruction.

Second, with the knowledge of the uniform regions, the coder may change the types of prediction mode candidates that are to be used for intra prediction by switching to a mode that results in higher rate distortion since the raising of distortion on a uniform region of an image should not be noticeable. Otherwise, inefficient, slow prediction modes could be disabled altogether to increase performance with a uniform region.

Third, since the neighbor pixel image data of the neighbor base blocks in a prediction block or current block may be used to form a prediction, and when a block is intra block copied, an intra prediction pipeline can stall while the neighbor pixels are fetched to actually perform the reconstruction of the source block and to provide a residual for the source block. In this case, when the coder knows data of a block of such a uniform region is going to be copied several times, the neighbor pixel values can be stored for quicker access to avoid slowing the pipeline. Otherwise, the neighbor pixels also can be pre-fetched once a hash is copied in a uniform region when it is clear that the hash code-based search will be used in uniform regions. This is a performance improvement that speeds up the process since normally a final mode decision would be made before the neighbor pixels would be fetched to reconstruct the source block in order to provide a residual for example.

Fourth, a quick change of image data in the detected flat uniform region may indicate a scene change, and the coder may be arranged to act accordingly.

As another aspect, the presently disclosed method and system may be adaptable to be applied to natural (or camera captured) video as well. This is accomplished by denoising, down-sampling, and downsizing the image data used to generate the hash codes. The denoising of the image data may be in addition to the denoising performed during video encoding pre-processing. Down-sampling the image data of the blocks here, similar to a rounding operation, includes truncating the image data by dropping least significant bit(s) (LSBs), which further removes noise and small insignificant gradients in the blocks of the image. Downsizing refers to using a reduction (such as pixels at intervals) or combination (such as averaging) technique in a block of pixels rather than using the image data of all pixels in a block. All three of these techniques will substantially increase the chances of finding hashes of reference and source blocks that are an exact match, thereby finding more matches for intra prediction that are consistent with visible image content where the image data appears the same to the human eye. By one approach, these techniques may be applied only for the hash-searches and are ignored for generating data of the prediction itself to determine a residual for the current or prediction block.

The application of the IBC hash-based searches to natural video provides a number of the advantages mentioned above such as the increase in performance and quality and reduction in power consumption due to the ability to eliminate certain searches and avoid use of more bit-costly prediction modes. Also, the application of this IBC method on natural video provides the opportunity to increase quality by lowering the QP for uniform blocks for example, and quality may be improved by providing a more accurate match than that available from the other conventional natural prediction mode searches. Otherwise, a source block with a matched hash code may be set as the start point for an IBC motion search.

Finally, the disclosed system and methods have performance improvements that vary depending on the hardware implementation. For example, fixed function hardware or CPUs generating a single hash size can be performed with reduced delays compared to the conventional hash size variations used due to the reduced amount of computations, or the amount of such hardware can be reduced due to the increase in sufficiency.

Figure 2:
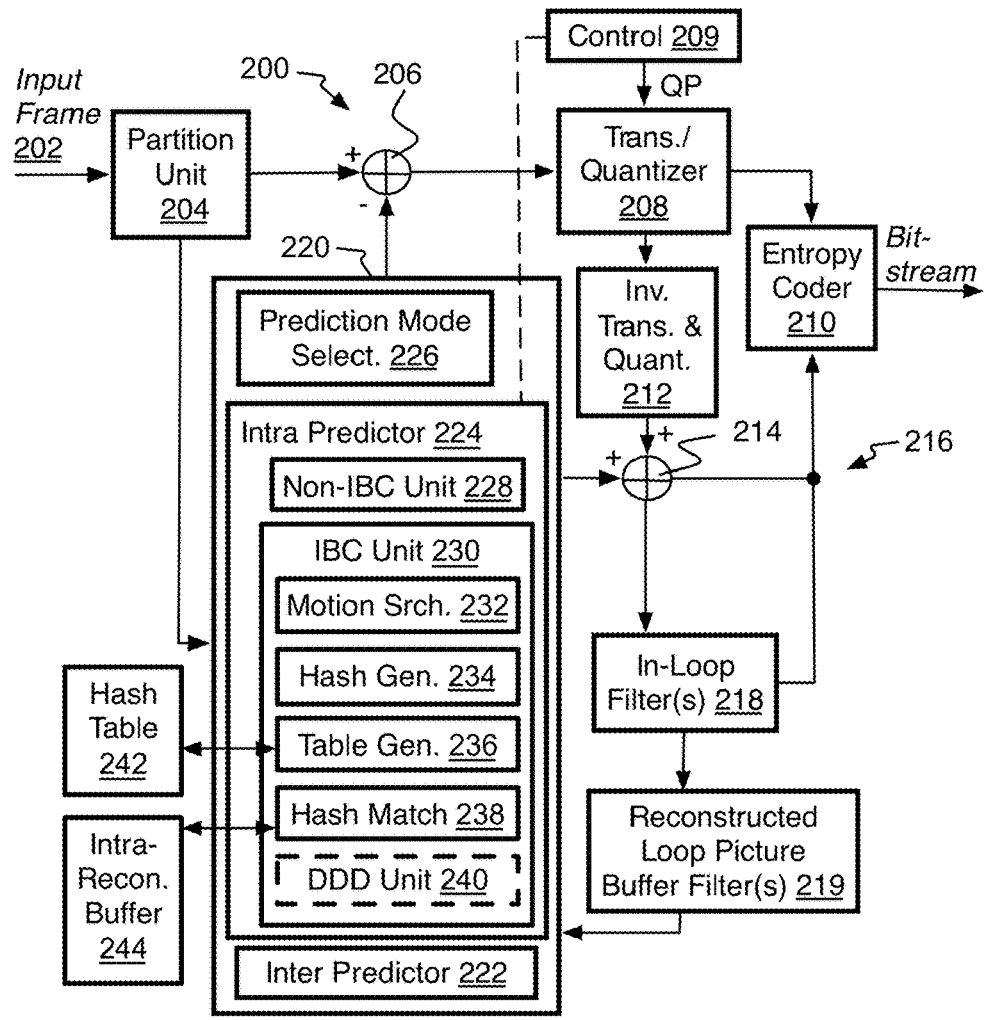
FIG. 2 is a schematic diagram of an encoder according to at least one of the implementations herein.

Referring to FIG. 2, an example video coding system (or image processing system or encoder) 200 performs the methods of screen content coding disclosed herein, and is arranged to perform at least one or more of the implementations described herein including intra block copying. In various implementations, video coding system 200 may be configured to undertake video coding and/or implement video codecs according to one or more standards. Further, in various forms, video coding system 200 may be implemented as part of an image processor, video processor, and/or media processor and undertakes inter-prediction, intra-prediction, predictive coding, and residual prediction. In various implementations, system 200 may undertake video compression and decompression and/or implement video codecs according to one or more standards or specifications, such as, for example, H.264 (MPEG-4), advanced video coding (AVC), VP8, H.265 (High Efficiency Video Coding or HEVC), VP9, Alliance Open Media Version 1(AV1), and others. Although system 200 and/or other systems, schemes or processes may be described herein, the present disclosure is not necessarily always limited to any particular video encoding standard or specification or extensions thereof except for screen content coding where mentioned herein.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the video coding system 200 may be an encoder where current video information in the form of data related to a sequence of video frames may be received for compression. By one form, the video sequence is formed of input frames 202 of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The system 200 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 200 may receive an input frame 202, which may be received from other computer applications as mentioned, or may be received from a camera, or may be a mixture of both. The input frames may be frames sufficiently pre-processed for encoding.

The system 200 also may have a prediction partition unit 204, a subtraction unit 206, a transform and quantizer unit 208, a control 209, and an entropy coder 210. The control 209 may manage many encoding aspects including at least the setting of the quantization parameter (QP) but could also include setting bitrate, rate distortion or scene characteristics, prediction and/or transform partition or block, available prediction mode types, and best mode selection parameters to name a few examples.

Figure 3:
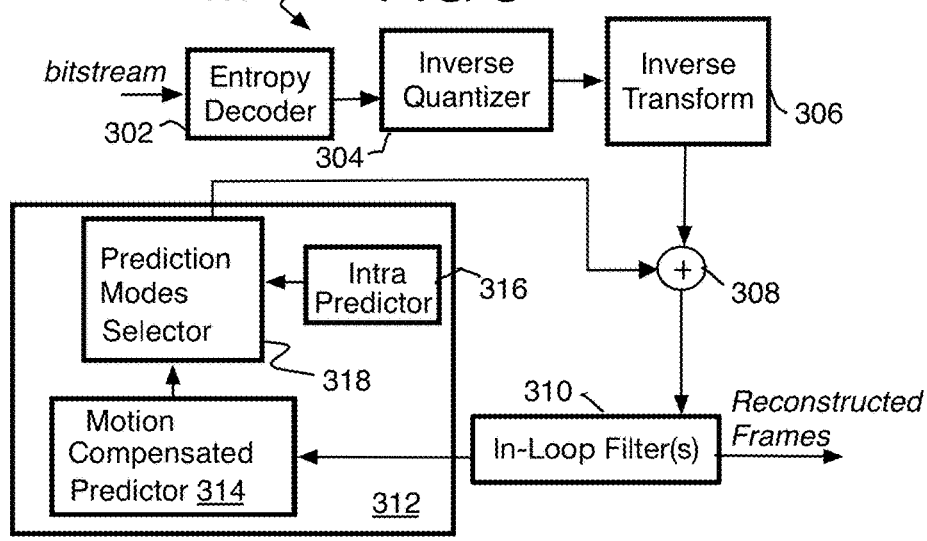
FIG. 3 is a schematic diagram of a decoder according to at least one of the implementations herein.

The output of the quantizer 208 may be provided to a decoding or prediction loop 216 to generate the same reference or reconstructed blocks, frames, or other units as would be generated at a decoder such as decoder 300 (FIG. 3). Thus, the decoding loop 216 may use inverse quantization and inverse transform unit 212, adder 214, and residual and prediction assembler units (not shown) to reconstruct the frames. Quality-improving in-loop filter(s) 218 then may be used to revise the frames. A reconstructed loop picture buffer 219 may hold the reconstructed frames to be used as inter-prediction reference frames.

The encoder 200 also has a prediction module 220 that has an inter-predictor unit 222 to perform inter-prediction including motion estimation and motion compensation, an intra-predictor unit 224 to perform the intra-prediction, and a prediction mode selection unit 226. The inter-prediction unit 222 may use motion prediction modes that form motion vectors such as block-matching hierarchical motion estimation (HME), integer motion estimation (IME), fractional motion estimation (FME), zero motion vectors (ZMVs), spatial neighbor block dependencies to obtain or generate motion vectors, and so forth.

The intra-predictor unit 224 has an intra block copy (IBC) unit 230 and a non-IBC unit 228 that provides the intra-prediction capability described in more detail below. Both the inter-prediction unit 222 and intra-prediction unit 224 provide predictions to the prediction mode selector 226 that selects the best prediction mode (including intra-modes) for a particular block, typically based on bit-cost and other factors. The prediction mode selector 226 may select an intra-prediction and/or inter-prediction mode when multiple such modes of each may be available. The prediction output of the selector 226 in the form of a prediction block is then provided both to the subtraction unit 206 to generate a residual, and in the decoding loop to the adder 214 to add the prediction to the residual from the inverse transform to reconstruct a frame.

More specifically now, the partition unit 204 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC coding of an entire I-frame or I-slice, spatial or intra-prediction is used, and in one form, only from data in the frame itself.

In various implementations, the IBC unit 230 either receives partitions from the partition unit 204 or may have operations to form, or receive, its own partition definitions to perform the IBC. Specifically, when an HEVC standard is being used, the prediction partition unit 204 may divide the frames into prediction units for both intra prediction, whether or not IBC, and inter-prediction. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block also may be divided into coding units (CU) in quad-tree split scheme. Further, each leaf CU on the quad-tree may either be split again to four CUs or divided into partition units (PUs) for motion-compensated prediction. In various implementations in accordance with the present disclosure, CUs may have various sizes including, but not limited to 64×64, 32×32, 26×26, and 8×8, while for a 2N×2N CU, the corresponding PUs also may have various sizes including, but not limited to, 2N×2N, 2N×N, N×2N, N×N, 2N×0.5N, 2N×1.5N, 0.5N×2N, and 2.5N×2N. By some forms, the smallest available prediction block is a 4×4 or 8×8 block, referred to herein as the base block size. It should be noted, however, that the foregoing are only example CU partition and PU partition shapes and sizes, the present disclosure not being limited to any particular CU partition and PU partition shapes and/or sizes. It should be noted that multiple alternative partitions may be provided for the same image area as described below.

For VP9 coding, a frame may be divided into tiles which are large sections of the frame, which are then divided into 64×64 pixel super-blocks. The super-blocks may be divided into smaller blocks, typically 24×24 or 8×8 for prediction block sizes but could be as small as 4×4.

The smallest block, when being used as a base block, is considered the smallest partition or division for forming a block that is available as an option for a particular encoder or intra-prediction unit of the encoder and will not be divided further by the encoder for intra block copying. Typically, this will be 4×4 pixel or 8×8 pixel blocks. However, the base block can be other than the smallest size as long as it is not the largest prediction block size. Thus, base blocks could be 16×16 macroblocks (MBs) for example, or other rectangular sizes when larger prediction block sizes exist.

In order to perform intra-prediction, the NON-IBC unit 228 may provide neighbor horizontal, diagonal, and/or DC intra-prediction to name a few examples, and referred to herein as "normal" intra-prediction. On the other hand, the IBC unit 230 may have both a motion search unit 232 to provide a motion (or normal) search and units to additionally or alternatively perform a hash-based search. The IBC motion search may include hierarchical block-matching searches similar to that performed for inter-prediction.

To perform the hash-based search, the IBC unit 230 may have a hash (or hash code) generation unit 234 to generate both reference hash-codes on previously constructed blocks of a current frame and source hash codes of the same current frame to provide source hash codes for a current block being reconstructed. The hash generation unit 234 also may perform operations to count and track the reference blocks with the same image data, and in turn same hash code, to detect uniform regions of an image as descry bed below. A table generation unit 236 may establish a hash table 242 to store the reference hash codes. A hash matching unit 238 compares the reference hash codes on the table 242 to the source hash codes. A version of the original image data or reconstructed reference blocks may be stored on an intra-reconstruction buffer 244 to be used as a reference frame to compare its hash codes to a current block being reconstructed. By one form, only those blocks of the current frame already decoded with reconstructed image date have a version of their original image data stored instead in the buffer to form a reference frame for IBC. Otherwise, the original data of all blocks of the frame could be stored instead to form the reference frame.

Optionally, a de-noising, down-sampling, downsizing (DDD) unit 240 also may be provided in order to apply the hash-based searches to natural (camera captured) video when desired. These operations may be applied before any other IBC operations and may be applied as an intra-pre-processing operation. Details of the operations are provided below.

Once it is found that the hash codes match, the intra-predictor 224 provides the image data of the one or more reference blocks with the matching hash codes as the IBC-hash-based-search prediction candidate to the prediction mode selector 226. By one form, previously reconstructed image data of the reference block are provided as the prediction, but alternatively, the original pixel image data of the reference block could be provided as the prediction instead. Either choice may be used regardless of the type of image data that was used to match the hashes.

When the IBC intra-prediction is selected as the correct mode for a prediction block, the predicted block then may be subtracted at subtractor 206 from the current block of original image data, and the resulting residual may be partitioned into one or more transform blocks (TUs) so that the transform/quantizer unit 208 can transform the divided residual data into transform coefficients using discrete cosine transform (DCT) for example. Using the quantization parameter (QP) set by the controller 209, the quantizer 208 then uses lossy resampling or quantization on the coefficients. The frames and residuals along with supporting or context data such as IBC intra block size and intra motion vectors and so forth may be entropy encoded by unit 210 and transmitted to decoders.

In some examples, video coding system 200 may include additional items that have not been shown in FIG. 2 for the sake of clarity. For example, video coding system 200 may include a processor, a radio frequency-type (RF) transceiver, splitter and/or multiplexor, a display, and/or an antenna. Further, video coding system 200 may include additional items such as a speaker, a microphone, an accelerometer, memory, a router, network interface logic, and so forth. Some of these components are shown on other implementations described herein.

Referring to FIG. 3, a system 300 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks as well as intra motion vectors for the IBC hash-based search reference blocks by one example. The context also may include prediction modes for individual blocks other partitions such as slices, inter-prediction motion vectors, partitions, quantization parameters, filter information, and so forth. The system 300 may process the bitstream with an entropy decoding module 302 to extract the quantized residual coefficients as well as the context data. The system 300 then may use an inverse quantizer module 304 and inverse transform module 306 to reconstruct the residual pixel data.

The system 300 then may use an adder 308 (along with assemblers not shown) to add the residual to a predicted block. The system 300 also may decode the resulting data using a decoding technique employed depending on the coding mode indicated in syntax of the bitstream, and either a first path including an intra predictor module 316 of a prediction unit 312 or a second path that is an inter-prediction decoding path including one or more in-loop filters 310. The intra predictor module 316 performs intra prediction including the IBC by using reference block sizes and the intra motion vectors extracted from the bitstream, and previously established at the encoder. By one approach, hash codes are not received or generated at the decoder since there is no need for them. A motion compensated predictor 314 utilizes reconstructed frames as well as inter-prediction motion vectors from the bitstream to reconstruct a predicted block.

The prediction modes selector 318 sets the correct prediction mode for each block as mentioned, where the prediction mode may be extracted and decompressed from the compressed bitstream. A PU assembler (not shown) may be provided at the output of the selector 318 before the blocks are provided to the adder 308.

The functionality of modules described herein for systems 200 and 300, except for the units related to the hash-based searches 234 to 244 for example and described in detail herein, are well recognized in the art and will not be described in any greater detail herein.

Referring now to FIG. 4, an example process 400 is arranged in accordance with at least some implementations of the present disclosure. In general, process 400 may provide a computer-implemented method of video coding with intra block copying according to at least one of the implementations herein. In the illustrated implementation, process 400 may include one or more operations, functions or actions as illustrated by one or more of operations 402 to 410 numbered evenly. By way of non-limiting example, process 400 may be described herein with reference to operations discussed with respect to FIG. 2 or 10 herein and may be discussed with regard to example systems 200 or 1000.

Process 400 may include "obtain image data of at least one frame of a video sequence" 402. The image data of the frames may present synthetic or screen content but could alternatively be natural camera-captured content or a combination of both. By one form, this operation includes obtaining the original image data, or a version of the original image data, rather than reconstructed image data such as from the decoder loop of the encoder. The original image data may be used to generate both reference and source (or current) hash codes. Also, the images may be pre-processed sufficiently for encoding including extra operations to apply IBC to natural video content when needed and if available.

Process 400 may include "generate reference base hash codes each associated with a reference base block that is a base block size of image data on the at least one frame" 404. Here, this operation includes computing a reference base hash code for individual or each base block, which may be a 4×4 or 8×8 block for example, and may be the smallest available prediction block, but need not always be the smallest as long as it is not the largest prediction block size available. The reference base hash codes may be computed for each pixel location on the frame so that the reference base blocks overlap and each, or individual, pixel location is an anchor pixel location for the base block, such as at the upper left corner of the base block. The reference base hash codes may be placed in a table that lists the anchor pixel location and the reference base hash code.

Process 400 may include "generate source base hash codes each associated with a source base block that is the base block size of image data on the at least one frame" 406. This operation may include dividing the frame into non-overlapping base blocks that is the same base block size as the reference base blocks, and computing a source base hash code for each of the base blocks. The source base hash codes may be computed on the fly as needed.

Process 400 may include "determine source base hash codes of a current block of the at least one frame to be reconstructed depending on which of the source base blocks are disposed within the current block, wherein the current block is larger than the base block size" 408. This operation may involve first selecting the largest available prediction block size as the current block to be reconstructed on the frame and for an anchor pixel location. By some examples form, the current block may be a 16×16 macroblock, 32×32 block, or 64×64 block. Once the position of the current block is obtained, the system determines which source base blocks are located within, or form, the current block. Once the position of the source base blocks within the current block are determined, the source base hash code of each of the source base blocks may be computed if not computed already.

The process 400 may include "determine at least one prediction of the current block or a prediction block within the current block depending on whether at least one match exists between one of the reference base hash codes and one of the source base hash codes of the current block" 410. This operation may involve looking up the source base hash codes of each of the source base blocks within the current block on the reference hash table. This may be performed hash by hash. This also may be repeated for each reference block matching the size of the current block on the reference frame. By one form, the current block may be positioned to (or compared to) each reference block location, represented at each pixel location, on the reference frame.

By another approach, the source base hash codes of the current frame are concatenated together to form a single source or current hash code for the current block. Each source base hash code forms a distinct part or portion of the concatenated source hash code and therefore represents a certain source base block in the current block. In this case, reference base hash codes also may be concatenated and of reference base blocks that cooperatively form the same size as the current block. The concatenated reference and source hash codes then can be subtracted from each other and any portion of the concatenated hash code that is zero immediately indicates which corresponding reference and source base hash codes match, and in turn, which reference and source base blocks match. In this way, if all corresponding source and reference base blocks match, then the entire current block hash code matches the reference hash code. In this case, the image data of the entire reference block corresponding to the current block forms the prediction. If parts are a match for base blocks that fill a prediction block within the current block, then that prediction block also may be used as a prediction. The reference data forming the prediction itself, after original image data is used to match hashes, could be the original image data or reconstructed image data. The prediction may be a candidate intra prediction to be considered for final selection along with other prediction candidates or it may be considered the final prediction without a selection operation among candidates.

As to another aspect, if only some of the source base hash codes are a match, the system can then determine if all of the source base hash codes are matched for any prediction block within the current block by using concatenation again. This could be a single base prediction block or prediction blocks such as 4×8 or 8×4 and so forth within a larger current block for example. By this example, the source and reference base hash codes first may be concatenated to form each of the desired prediction block sizes before the reference and source base hash codes, now in concatenated prediction block hash codes, are compared to each other. The prediction for each prediction block then may be provided as a candidate intra prediction for selection among a number of other candidates. Whether or not concatenation is used, these arrangements avoid the need to set up multiple reference hash tables each for a different prediction block size, thereby reducing required memory capacity and delay. Other details are provided below.

As mentioned, the IBC system and method also may detect uniform regions of the frame by using region ids that indicate when reference base blocks are considered to be located in such a uniform region. This may be accomplished by first determining whether the hash code of a current base block is already on the reference hash list or table. If so, then it is determined whether one or more neighbor base blocks relative to the current base block has the same base hash code which is already in the reference hash table. By one approach, this looks to the left and upper neighbor base block of the current base block to determine if it has the same hash code. If so, the region id of the neighbor base block is used for the current base block on the reference hash table or separate table, and the region id is incremented by one for the current base block. If no neighbor has a matching hash code, then a new region id is started for the current base block. The system may maintain at least a count of a number of base blocks, and in one form, also the location of base blocks, that have the same base hash code in order to track the position and extent of the uniform regions.

Also, the system may indicate a current base block on the current frame is within a uniform region when a same base block location on a previous frame relative to the current frame was determined to be in a uniform region and has the same base hash code of a previous base block at the same base block location on the previous frame. When the current block or prediction block is found to be in a uniform region, the system may (a) lower a quantization parameter of the current block or prediction block to raise the quality of the block, (b) change which prediction modes are to be considered for the current block or prediction block, and (c) detect a scene change when a sufficient number of base blocks in a uniform region has a different hash code than the same base block pixel location on a previous frame. More details are provided below.

Also as mentioned, the hash-based IBC disclosed herein could be applied to natural camera-captured video as well. This is possible by modifying image data to be used to generate the reference and source base hash codes to increase the probability of finding matching reference and source base hash codes. For example, the original image data may be denoised again if already performed in pre-processing for the encoder, down-sampled by truncating LSBs from the image data, and downsized by sampling some interval of pixel locations forming the blocks. Other details are provided below.

Figure 5B:
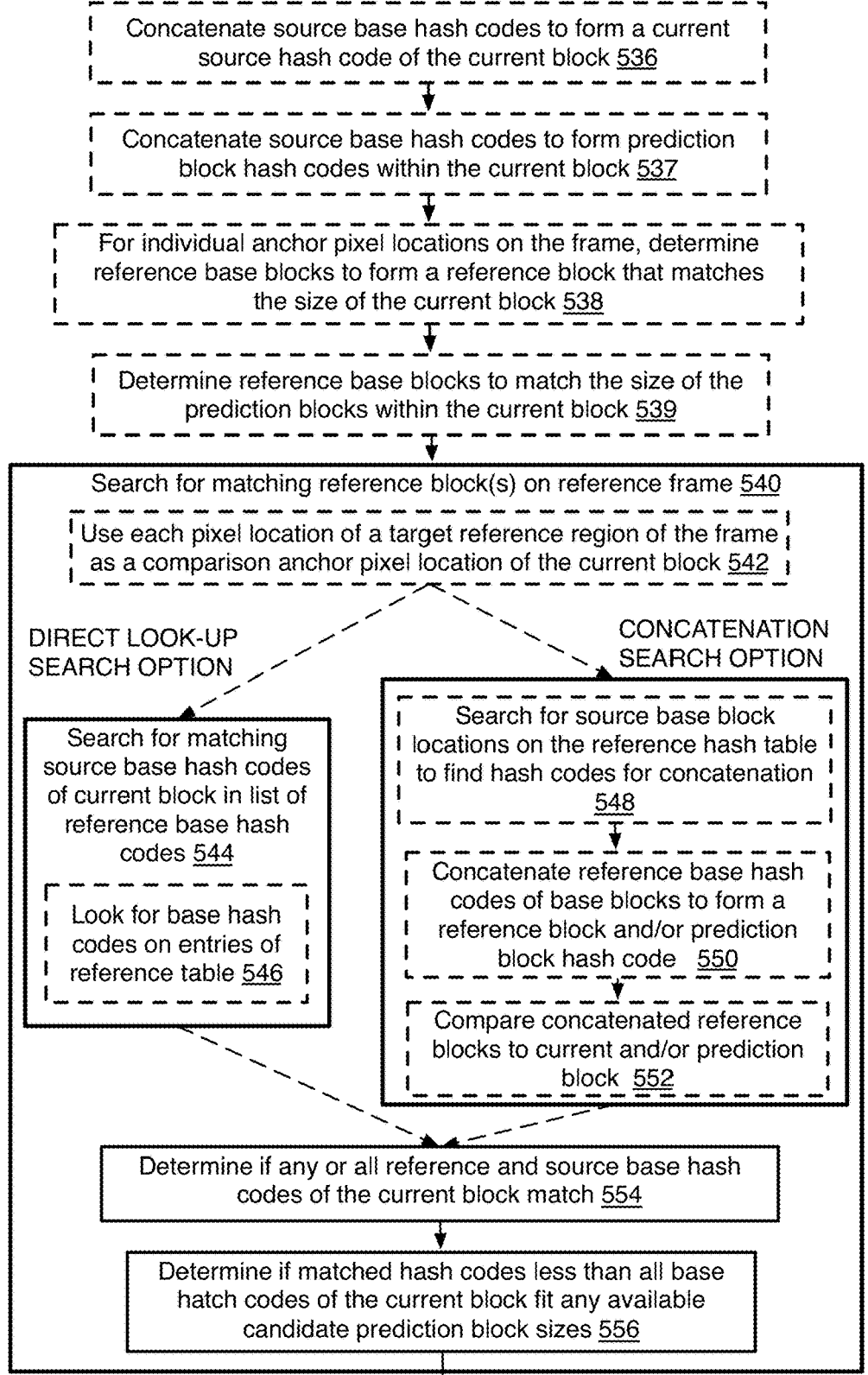
Figure 5C:
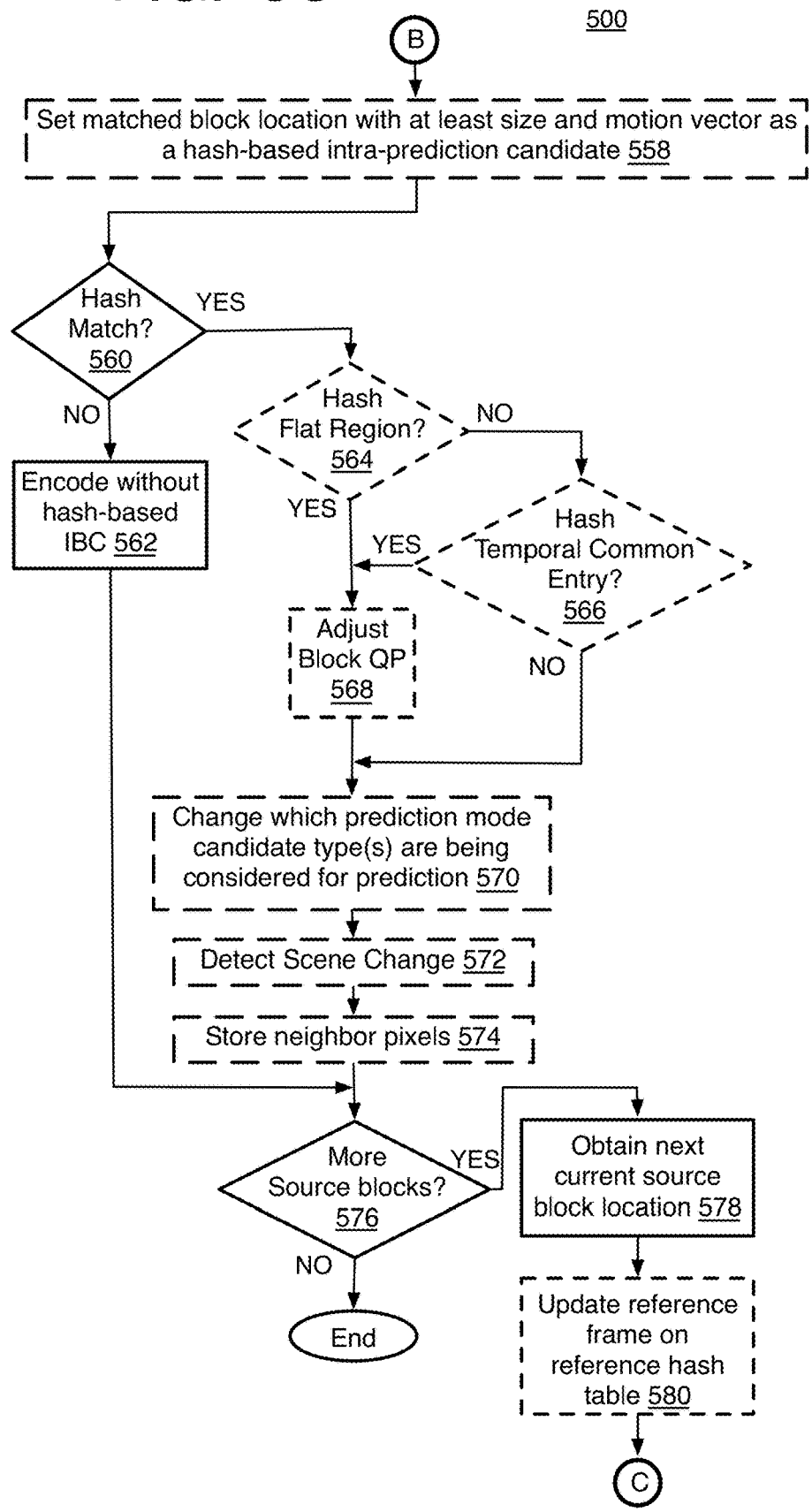

Referring to FIGS. 5A-5C, an example process 500 is arranged in accordance with at least some implementations of the present disclosure. In general, process 500 may provide a computer-implemented method of video coding with intra block copying as mentioned above. In the illustrated implementation, process 500 may include one or more operations, functions or actions as illustrated by one or more of operations 502 to 580 generally numbered evenly. By way of non-limiting example, process 500 may be described herein with reference to operations discussed with respect to FIG. 2 or 10 and with regard to example systems 200 or 1000 discussed herein.

The process 500 may include "obtain image data of a frame of a video sequence" 502, and this is as described above with system 200 and process 400.

The process 500 may include "pre-process frame" 504, and this may include pre-processing of the image data sufficiently for encoding generally. Thus, this may include denoising and so forth. By one alternative, pre-processing specifically for IBC may include formatting the original image data so that the hash-based search IBC can be applied to natural camera-captured images as well. This may involve performing an additional denoising as well as down-sampling and downsizing the image data, the details of which are provided below after the description of process 500.

The process 500 may include "generate reference hash codes of reference base blocks to form reference frame" 506. Particularly, instead of calculating the hash code for different block shapes and sizes, only the hash code for a base block, such as the smallest available prediction block, for example 4×4 blocks or 8×8 blocks. Alternatively, the base blocks may be a fixed size that is not the smallest block but is not as large as the current block described herein, which often is the largest prediction block size available. These reference base hash codes are calculated and stored in a single buffer or single table for example as follows.

The process 500 may include "create reference hash table" 508, and this may involve always automatically forming the table or forming the table only when frames are set to have hash-based searching available. The table may be set up with a hash entry and a block location (or anchor pixel location more specifically for each entry. Each entry also may have a region id field as described below. The table may be set up to receive 32 bit DWORD reference base hash codes of base blocks and an anchor pixel location of each corresponding base block. By one example, the table may order the entries by anchor pixel location in raster-scan order when concatenation is to be used as explained below. By another alternative, the reference table may be ordered by hash code when direct hash code look-ups will be performed. By another aspect, the reference hash table is arranged to store only the hash codes of previously decoded reference base blocks, but in other forms, reference hash codes are stored for all base blocks of all anchor pixels on the frame. Other desirable partitions for storing parts of a reference frame, such as slices, may be used instead regardless of which base blocks have already been decoded since the hash codes can be based on original image data rather than the reconstructed image data. As mentioned, only one hash table needs to be generated since only one block size is being used to compute hash values, and this also lowers power consumption as well as the reduction of memory and delay versus formation of multiple tables.

Referring to FIG. 6, the process 500 may include "create reference hash entries" 510, and this may include "compute reference base hash code for individual base blocks" 512. This may involve reading the pixel locations for the block from pixel 0 to pixel N in a fixed order. Each pixel is passed to a hash function which generates a random value (32 bit DWORD suffices) based on the pixel value and the prior state. So it starts from a fixed state and each subsequent pixel adjusts the hash value created which creates a unique hash code that has a low mathematical probability of creating a false positive match for the given pixel values. The hash table stores the 32 bit DWORD for the hash and the list of corresponding pixel locations that match that hash value.

By one form, the original image data is obtained for a base block anchored at each pixel location on a frame where the anchor pixel location is the upper left corner of the base block. This forms overlapping base blocks for every possible base block position on the frame. For example, a 4×4 base block is provided for each pixel location 601 in a reference frame 604 on an image 600. A 4×4 base block 602 is shown with an anchor pixel location (0,0) 604 and 16 pixels from (0,0) to (3,3) as shown. The $H_{4\times4}$ (0,0) designation indicates that pixel location (0,0) has a base hash code for the base block 602, and for indexing on the reference hash table, the method considers the hash code to be located at the anchor pixel location. The next 4×4 base block to the right will have its anchor at anchor pixel location $H_{4\times4}$ (1,0) 606 including pixels (1,0) to (4,3), and so forth in raster scan order for example although other orders can be used. The result is that the 4×4 base blocks are overlapping as shown on image 600. Depending on the specification of the video coding standard, those base blocks that are cut off at the right side and bottom edge of the frame 600 may be padded with image data that is the same as the bottom edge pixels or right edge pixels or both, or by other techniques, to replicate the edge pixels outward form a full base block's worth of image data when needed. By another form, the pixels that do not fit into a full single base block are simply skipped.

Also by this example, the process 500 may include "obtain image data of base blocks base block by base block" 514, so that the reference hash codes may be computed from the original image data by the present example.

By one alternative, the process 500 may include "form base blocks and reference base hash codes for previously encoded reference frame portion" 516. In other words, and in this case, the reference hash table may only hold those reference hash codes of the base blocks that have already been decoded by the decoder loop of the encoder. The generation of predictions for a current block then only may be performed by the data of those previously reconstructed reference blocks. Thus, the reference frame for purposes of intra coding is typically the portion of the current frame that has been previously encoded so far.

In another alternative, the reference hash codes of the blocks of the entire frame could be generated and stored in the reference hash table instead. This is possible since the hash codes are computed by using original image data instead of the reconstructed image data. It should be noted, however, that the prediction itself may be formed of the reconstructed image data even though the selection of a reference block was based on hash matching using the original image data.

As to the computation of the hash code itself, the hash value of a block may be generated based on the block's characteristics, such as horizontal and/or vertical gradients, direct current (DC) information (such as a mean signal value), a pixel's cyclic redundancy check (CRC) value, original pixel image data which is used in the examples herein, or alternatively reconstructed pixel data. Here, a hash value H for a block of 4×4 or 8×8 pixels may be calculated using known algorithms. An input data series is the image data of the block typically in raster scan order within the block. The output of the hash algorithm here is a 32 bit double word (DWORD). A hash H is provided for each pixel location in a frame or parts of a frame as shown on image 600 (which is reference frame 603) and as mentioned above.

Also as mentioned when computing the reference base hash codes, the process 500 may include "compare hash code to neighbors to find uniform regions" 518. Specifically, while the reference hash table is being filled by entries, this operation creates a count of consecutive neighbor locations with a same hash value to indicate a uniform region or area of image content on the current frame. As mentioned, the system calculates reference hashes for base blocks in some sequential fashion, which may or may not be raster-scan order. Once a reference base hash code is computed for a current base block, that reference base hash code is stored in the reference table unless the same hash code is already in the table. If so, then neighbor blocks next to the current base block are checked to determine whether the neighbor base blocks already have their hash codes and if those hash codes also are the same as the hash code of the current base block. This indicates that base blocks have the same or substantially same image data, and is therefore likely to be a uniform region of the image with a single color and brightness. The neighbor blocks may be the upper and left block but could be more or less neighbor blocks, or different neighbor blocks.

Referring to FIG. 7A for a specific example, an image or reference frame 700 may have a uniform region or region 702 with base blocks represented by anchor pixel locations 704 to 722 that each represent a base block in the uniform region 702. A current anchor pixel location 716 has a 4×4 base block 730, while left neighbor anchor pixel location 714 represents a 4×4 base block 732 and upper neighbor anchor pixel location 710 has a 4×4 base block 734 as shown in dash line. When the region 702 was being established and anchor pixel location (10, 23) 716 was being checked, it was found that its hash value 0xBEEF was already in an entry on the reference hash table. In this case, the system checks the neighbor pixel locations next to the current base block location 716 including left neighbor (9, 23) 714 and upper neighbor (10, 22) 710 to see if they have the same hash code. If neither neighbor location 714 and 710 already has that same hash code entry, a new region id is created for the uniform region such that the hash code 0xBEEF also now may be considered a region label and is started with a one count for anchor pixel location 716. But if one of the neighbors 714 or 710 does have the same hash code, then the region id of that hash code associated with one of the neighbors and now the current anchor pixel location is incremented by one.

Process 500 then may include "maintain at least count of region size(s)" 520, where a counter of the region id of that same or duplicated location is incremented to indicate how many blocks are part of that region. For example, the uniform region 702 on the image 700 has 10 anchor pixels, and in turn 10 base blocks. The location of the blocks for a region, or indication of the membership in the region, also may be stored for each count. The larger the count, the larger the uniform region.

While certain large flat regions such as all white or all black pixels will be fairly common for some usages, a test to make sure the region is not simply a pattern such as an alternating pattern that is not uniform, such as stripes, is described below. The counter may be incremented for an entire frame before the intra-coding is performed (pre-indexing) when original image data is being used to generate the hashes.

The count may be maintained on a separate table that lists only regions by hash code as the region id and then provides a field for a count value for each region id. Otherwise, the count may be maintained on a separate table or on the reference hash table by listing each reference hash code and corresponding pixel location, and then providing a region id field for each entry. Whether separate table or reference hash table, the region id may be different than the hash code itself, such as a binary count of regions. Many variations exist.

Alternatively to improve latency, the uniform region count of the prior frame relative to the current frame being reconstructed also could be stored and would be generally reliable since temporal redundancy is the main source of compression in video codecs. By one approach, such prior count may be used instead of the count on the current frame. By another form, the count and location of the uniform region of the prior frame may be stored in addition to the count on the current frame to provide a temporal common entry test for uniform regions on the current image as described below. Detected changes in temporal complexity also can indicate a scene change such that the IBC method may be disabled to limit the IBC to when quality and/or performance can be improved based on the commonly repeated values from frame to frame.

As described below (operations 566 and 570), the method may adjust the quantization parameter and/or which prediction modes are to be used depending on whether or not a base block or current block is within a flat uniform region. This may improve quality and reduce the computational load and delay.

Then, the process 500 may include "place reference hash codes on table" 522, and in the order and format as mentioned above.

Figure 8:
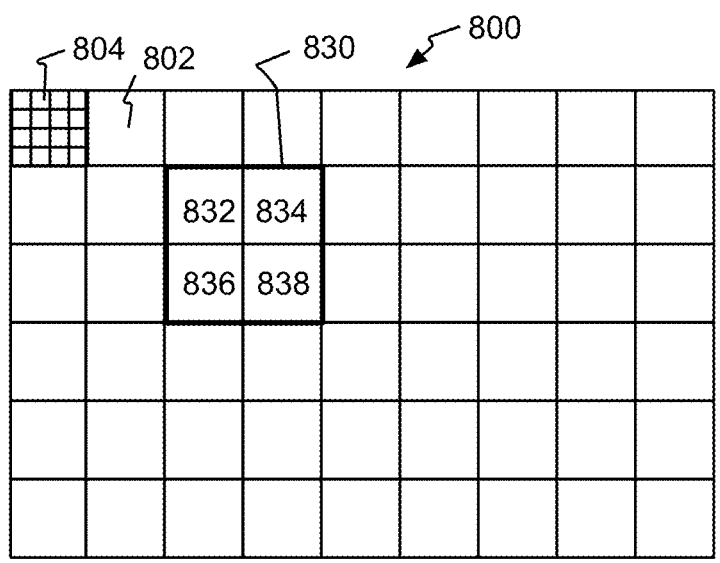
FIG. 8 is a schematic diagram of an image showing source base blocks with matching base hash codes according to at least one of the implementations herein.

Referring to FIG. 8, the process 500 next may include "generate source hash codes of base blocks of frame" 524, and this may first include "divide frame into non-overlapping base blocks" 526 as shown on image 800 that is divided into 4×4 base blocks 804. The same size base blocks are used as that for the reference base blocks such as 4×4 or 8×8 for example, which may be the smallest prediction block size available but could be another size as long as it is not the largest prediction block size (which may be the current block size) available as mentioned above with the reference base blocks. These blocks are not overlapped since they correspond to the only possible current block positions.

The process 500 may include "obtain source base hash codes of base blocks" 528, and where the source base hash codes are computed in the same or similar way as the reference base blocks. The source base hash codes are also computed based on the original image data. By one example approach, the source base hash codes can be obtained from the reference base hash codes of the same block pixel location on the frame when the reference base hash codes are available to do so. Thus, since both are computed from the same original image data with the same algorithm at the same block positions, the anchor pixel location of the source base block may be looked up on the reference hash table, and the reference base hash code may be used for the source base hash code of the same base block location. This of course would need the reference frame to include hashes of reference blocks that are already decoded for whichever source blocks are having their source hash codes being computed. By another form, the reference hash code could be formed from reconstructed image data from the decoder loop of the encoder and instead of the original data.

The process 500 may include "obtain location of first current block to be reconstructed" 530, and the pixel anchor location of the current block is obtained per usual IBC process. The selection of the current block may or may not be in raster scan order. As mentioned, the current block is not the smallest prediction block size, and should be the largest prediction block size to be reconstructed. This usually may be 64×64, 32×32, or 16×16, but could be other sizes such as 8×8.

The process 500 may include "determine which source base blocks are disposed within the current block" 532. Thus, once the current block is selected, the system determines which source base blocks are located within, or form, the current block on the current frame, and obtains the anchor pixel location of each of those source base blocks. For example, say the current block is 8×8 pixels and the base block is 4×4, then the system finds the anchor pixel location of the four 8×8 source base blocks within the current block on the current frame that forms the current block. For example, say an 8×8 current block 830 on image 800 is found to have four base blocks 832, 834, 836, and 838. The system will find the anchor pixel location, here the upper left corner pixel location, of each of the base blocks 832, 834, 836, and 838.

The process 500 next may include "obtain source base hash codes of the source base blocks within the current block" 534, and obtains the source base hash codes for each source base block in the current block computed as described above. Also as mentioned, the source hash codes may be 32 bit DWORDs but other lengths could be used. These source base hash codes may be computed on the fly and saved in memory such as the local cache or in a buffer reserved for this or other encoding purposes such as the row store cache, and during hash matching operations.

Figure 9A:
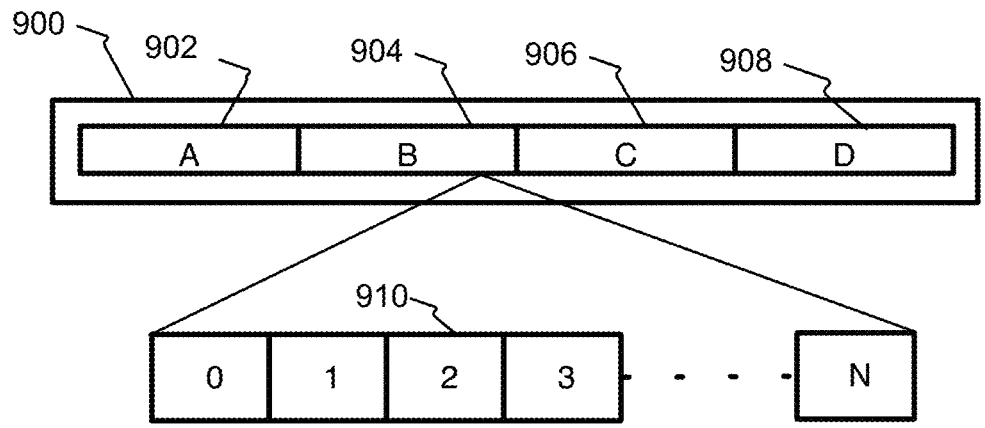
FIG. 9A is a schematic diagram of a hash code according to at least one of the implementations herein.

By one form, and while referring now to FIG. 9A, process 500 may include "concatenate source base hash codes to form a current source hash code of the current block" 536 when the concatenation search option is being used. In this case, once all of the source hash codes of the current block are obtained, or as the hash codes are obtained, the source base hash codes A-D (902, 904, 906, and 908) are concatenated into a single large source or current hash code 900. As shown, each hash code may have N bits 910 here where N=32 for example. Each source base hash code 902, 904, 906, and 908 remains a distinct part or portion of the current concatenated hash code 900 to represent the respective source base blocks (which could be base blocks 832, 834, 836, and 838 of image 800 for example).

Also as mentioned above, the encoder or system may be set to check whether or not prediction blocks smaller than the current block also have predictions indicated by matching hashes, where each prediction block match also may form an intra prediction candidate. For example, if the current block is 32×32 and the base blocks are 8×8, such a current block may include one or more coding tree unit prediction blocks of 16×32, 32×16, 16×16, 8×16, 16×8, and 8×8 prediction block size options. In this case, the encoder may be set to determine intra predictions for each size when a hash match is found.

By one optional approach for the concatenation search option, only the current or source block is concatenated. In this case, the smaller prediction blocks within the current block do not have their own concatenated hash codes. As explained below for this option, the matching portions of the source hash code are simply used to determine whether their associated source base blocks fill one of the prediction block sizes and positions.

Figure 9B:
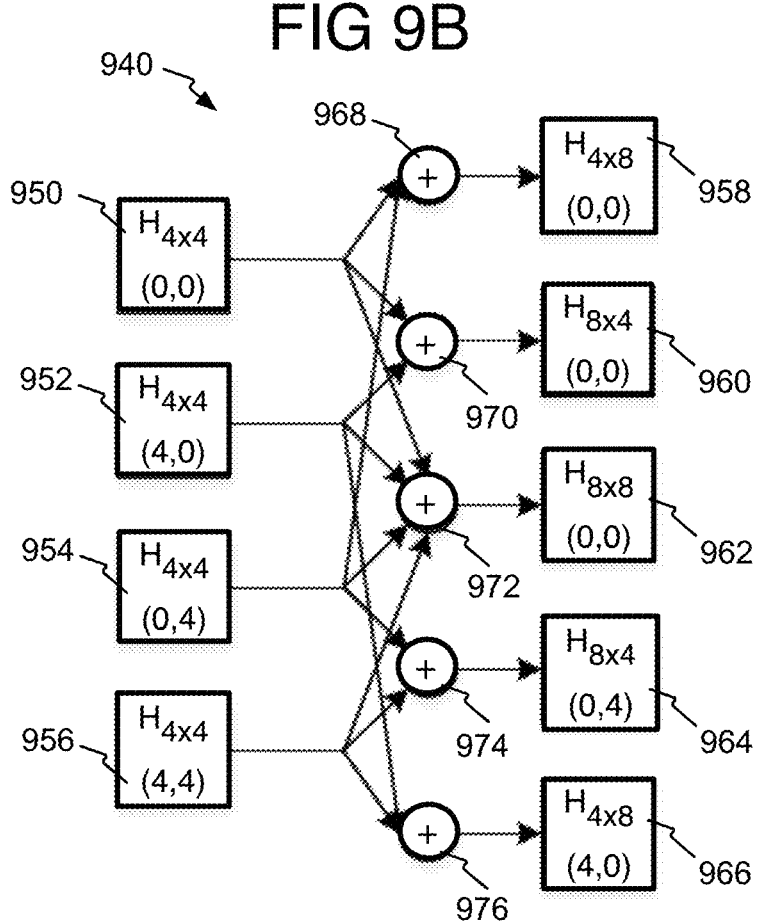
FIG. 9B is a schematic diagram to explain hash code concatenation and block correspondence according to at least one of the implementations herein.

Referring to FIG. 9B, and by a different approach for the concatenation search option, process 500 also may include "concatenate source base hash codes to form prediction block hash codes within the current block" 537. Here, the system forms a concatenated prediction hash code for each prediction block size and position within the current block that is available as a hash-search candidate. The concatenation is formed similar to the current block concatenation 900 (FIG. 9A). During operation, and during the searching stage by one form, a concatenation system 940 may be used. Here, say the current block is 8×8 and the base blocks are 4×4. The input is the hash codes 950, 952, 954, and 956 for all 4×4 base blocks within the larger current block. For the system 940, these hash codes may be concatenated together to form a current hash code for the entire current block and each of the prediction blocks within the current block. For example, for a 4×8 block at location [0, 0], hash codes for two 4×4 base blocks, $H_{4\times4}$ (0,0) 950 and $H_{4\times4}$ (0,4) 954 are concatenated together to create a new 4×8 prediction block hash code 958 using adder 968. For an 8×4 prediction block at location [0,4], hash codes for two 4×4 base blocks $H_{4\times4}$ (0,4) 954 and $H_{4\times4}$ (4,4) 956 are concatenated together to create a new 8×4 concatenated prediction block hash code 964 using adder 974. For the 8×8 current block (or larger prediction block) at location [0,0], the hash codes for all four 4×4 base blocks, $H_{4\times4}$ (0,0) 950, $H_{4\times4}$ (4,0) 952, $H_{4\times4}$ (0,4) 954, and $H_{4\times4}$ (4,4) 956 are concatenated together to create a new current block hash code 962 using adder 972. This results in multiple concatenated hash codes which should include the concatenated hash code of the current block as well as each or individual prediction blocks as set by the encoder. By other forms, the concatenation may be performed separately from the concatenation of the entire current block.

The process 500 next may include "for individual anchor pixel locations on the frame, determine reference base blocks to form a reference block that matches the size of the current block" 538. This operation is similar to operation 532 except here, the current block does not have a fixed location on the reference frame. Thus, this operation involves grouping the reference base blocks by relative location to form the size (meaning the dimensions and the shape) of the current block. Thus, for example, if the current block is 8×8, when the anchor pixel location of the current block (its upper left corner) is placed for comparison at (0,0) on image 600 (which is reference frame 604) for example, then the four 4×4 base blocks represented by their four anchor pixel locations, and their hash codes at those locations, is (0,0) 604, (4,0) 608, (0,4) 612, and (4,4) 616. The four base blocks forming the current block shifted to the right by one pixel are the four 4×4 base blocks with anchor pixel locations, and in turn hash codes, at (1,0) 606, (5, 0) 610, (1,4) 614, and (5,4) 618, and so on. Once the location of the reference base blocks are determined for the current block, the reference hash codes for those base blocks can be looked up in the reference hash list or table for the concatenation search option. As explained below, this operation may be used for either the direct look-up search option or the concatenation search option.

When the base blocks are to be concatenated to form the prediction blocks within the current block as well, then process 500 also may continue to include "determine reference base blocks to match the size of the prediction blocks within the current block" 539 thereby determining which reference base blocks form which prediction blocks. By one approach, this operation simply involves determining the reference base hash codes of the reference base blocks found to form the current block size together and that are to be input into designated inputs of a concatenation system such as system 940 with adders to generate the concatenated prediction block hash codes. This also may generate the current block hash code when so desired.

The process 500 may include "search for matching reference block(s) on reference frame" 540. By one approach for this operation, the process 500 may include "use each pixel location of a target reference region of the frame as a comparison anchor pixel location of the current block" 542, where each overlapping block location in the reference frame is compared to the source or current block. By one form, the reference block that is formed of reference base blocks included to be the same size as the current block is placed at each pixel location on the reference frame for the comparisons to the current block. As mentioned, this may only occur on the reference frame that has been decoded so far, but other regions or the entire frame may be used instead as described above.

As mentioned, a number of different ways exist to perform the hash matching. First, the direct look-up search option is described. For this option, the process 500 may include "search for source base hash codes of current block in list of reference base hash codes" 544, and when the reference list is a reference hash table, the process 500 may include "look for base hash codes on entries of reference table" 546. Specifically, this operation may involve looking-up the source base hash codes forming the current block in the reference hash table. By one option, this could simply involve looking up each source base hash code in the reference block independently and in the reference hash table hash by hash. Typically, however, the relative positions of source base blocks of the current block still need to be tracked because finding reference base blocks with hashes that match the hashes of the source base blocks but in random locations dispersed on the frame will not result in a very accurate prediction.

Thus, and while referring again to FIG. 6, the method may look-up the source base hash code of a first source base block in the current block such as the upper left corner source base block of the current block. In this case, the reference hash table may first be ordered by hash code. The method searches the table anchor pixel location by anchor pixel location until the matching hash code is found. Once the matching hash code is found, the reference block with the same size as the current block is set at that anchor pixel location, say at pixel (0,0) 604 for a 8×8 reference block with 4×4 base blocks. Then, the source base hash codes of the other base source blocks in the current block are also looked up. By one form, all matches to reference base hash codes on the table are found for each of those other source base blocks. It is then determined 554 if any of those matches have the locations that are next to the first reference base block (0,0) with a matching reference base hash code. Thus, for example, among the hash matches, it is determined, or known, that the three other source base blocks, and in turn, reference base blocks, next to the base block at (0,0) 604 are located at (4,0) 608, (0,4) 612, and (4,4) 618. If no match exists on any of those four base blocks, the 8×8 reference block is moved to the next anchor pixel location for the reference and current block comparison. If all of the source base blocks of the current block are matched, then the 8×8 reference block at that anchor location (0,0) is a match and can be used as the prediction or as one of the candidate predictions.

Figure 7B:
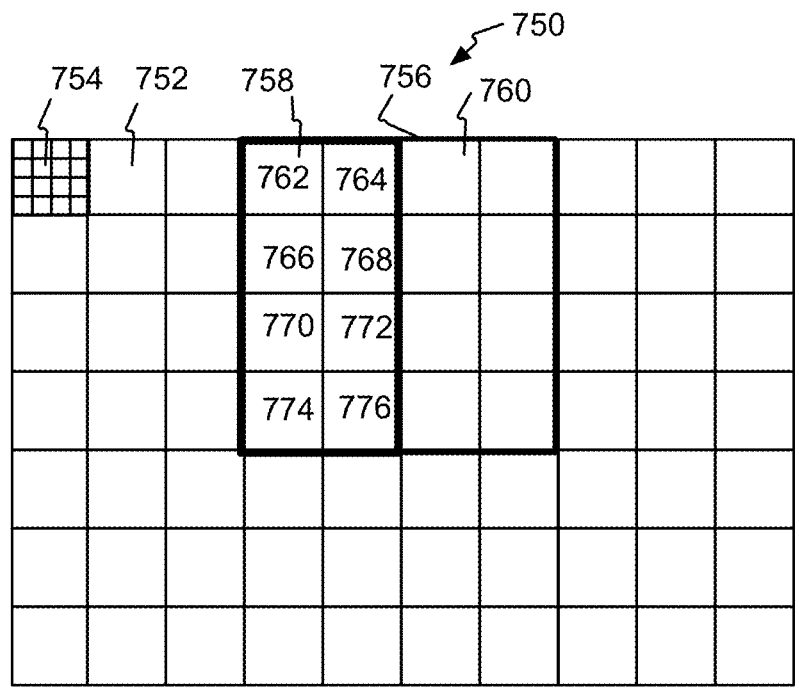
FIG. 7B is a schematic diagram of a reference frame showing a hash code matched block according to at least one of the implementations herein.

Referring to FIG. 7B, when only some of the source base hash codes of the current block have a matching reference base hash code at a particular reference block pixel location, then process 500 may include "determine if matched hash codes less than all base hash codes of the current block fit any available candidate prediction block sizes" 556. Thus, it can be determined whether any other prediction block size, say 4×8, 8×4 in two possible positions within the 8×8 reference block is filled with matching hashes. Thus, for example, reference frame 750 may have reference base blocks 752, here being 4×4 pixel base blocks 754. A 16×16 reference block 756 is shown with potential prediction 8×16 blocks 858 and 760. No matches occurred in 8×16 prediction block 760 so it is ignored. However, prediction block 858 has hash matches in all of its reference base blocks 762 to 776 numbered evenly. So as shown here, if any one or more of these prediction blocks also have all of their source base hash codes matched to reference base hash codes, then the matched prediction blocks also can be intra-predictions.

The method then proceeds by moving the reference block to the next anchor pixel location to repeat these operations and determine if more predictions exist at that location and so on until all or individual possible reference block positions on the reference frame have been considered.

By another option returning to the example of image 600 with 8×8 reference and current blocks, the locations of the three other source base blocks (4,0), (0,4), and (4,4) next to the first source base block at (0,0) in the current block may be looked-up by location instead. In this case, the reference hash table may be listed secondarily by anchor pixel location such that the entries of the same hash codes are generally listed in raster-scan pixel order for example. This operation method obtains the relative locations (by pixel length or block count for example) of the other source base blocks within the current block and sets them as the locations of the reference base blocks to be looked-up on the reference hash table. By example, once it is known that pixel location (0,0) 604 (FIG. 6) has a matched reference base block, then the next blocks over and down to fill the 8×8 reference block are looked-up, here being (4,0) 608, (0,4) 612, and (4,4) 616. When no matches are found, all matches are found, or only some of the matches are found, the method proceeds as mentioned above in the same way when only hash codes are looked-up on the reference hash table.

Turning now to the concatenation search option, the process 500 may include "search for source base block locations on the reference hash table to find hash codes for concatenation" 548. In this case, the reference hash table is listed in order by anchor pixel location first. The method proceeds by placing the reference block at a first anchor pixel location on the reference frame and obtaining the relative anchor pixel locations of the reference base blocks that align with the source base blocks in the current block. Thus, for example, say an 8×8 current block has four source base blocks anchored at pixel locations (0,0), (4,0), (0,4) and (4,4), and the source base hash codes for each of the four source base blocks has already been generated and concatenated together into a single current block hash code according to operations 534 and 536 described above. Then, referring to FIG. 6, a first reference block with the same size as an 8×8 current block may be placed at anchor pixel location (0,0) 604. Thus, the four reference base blocks that align with the four source base blocks of the current block may be anchored at anchor pixel locations (0,0) 604, (4,0) 608, (0,4) 612, and (4,4) 616. Each of these four pixel locations are then looked-up in the reference hash table. The hash code entry at each of the pixel locations, and in turn for each of the reference base blocks anchored at that pixel location, is then obtained.

The process 500 may include "concatenate reference base hash codes of base blocks to form a reference block and/or prediction block hash code" 550, such that reference base hash codes just obtained are concatenated together as explained with the concatenation 900 (FIG. 9A) used with the source concatenation.

The process 500 then may include "compare concatenated reference blocks to current and/or prediction block" 552, where here the source concatenation (or source concatenated hash code) and the reference concatenation (or reference concatenated hash code) are compared. This may include simply subtracting the two values or using some other comparison operation. By one form, the concatenated hash codes do not need to be stored in a buffer, and need only be held in logic gates or flops for hash generation, for example. The concatenated hash codes then are fetched to check for matching so that this operation may be performed on the fly. By one form, this memory may output 4 bits at a time, and then a 4-bit AND operation may be used to perform the matching.

The process 500 may include "determine if any or all reference and source base hash codes of the current block match" 554. Thus, by one option the concatenations for the whole current block and reference block are compared, which are the largest possible prediction block sizes. If the two concatenations are exactly the same, then a match is established for the large current block, and this may be used as the prediction or a prediction candidate. By one approach, this may be the only candidate for the reference block position, and the reference block may be moved to the next anchor pixel location to test the new location. This may be repeated for all pixel anchor locations in the reference frame.

By another alternative, the process 500 may include "determine if matched hash codes less than all base hash codes of the current block fit any available candidate prediction block sizes" 556. This will be more typical here, and whether or not the current block and reference block are an exact match, the smaller prediction blocks within the current and reference block also may be tested to be additional prediction candidates when hash codes match for the prediction blocks. This can be performed in a number of different ways, and all without performing any more look-ups on the reference hash table since all reference base hash codes of all reference base blocks forming the reference block, and in turn current block, are already obtained to form concatenation of the reference block.

By one option, each available prediction block size has its own source and reference prediction block concatenations of the respective hash codes of the source and reference base blocks that form the prediction blocks. Thus, referring to the image 600 of FIG. 6 again for example, the reference base hash codes of the 4×4 reference base blocks anchored at (0,0) 604 and (0,4) 612 were already obtained for the 8×8 reference block concatenation. So now a 4×8 reference prediction block may be formed with those two reference base blocks, and this is similar for the source prediction block. Thus, these two hash codes, actually designated $H_{4\times4}$ (0,0) and $H_{4\times4}$ (0,4) can be concatenated together for the 4×8 prediction block, and then the two concatenated hash codes of the source and reference prediction blocks can be compared. If the hash codes are an exact match, then this prediction block can be used as a prediction candidate. This may be repeated for each prediction block size, and then repeated again for each or individual reference block position on the reference frame.

By yet another option, even though the reference and source blocks were concatenated, the concatenation operation for the prediction blocks may be skipped. In this case, the method tracks which part of the concatenation hash code of the reference block match and which do not. As mentioned above with the concatenation 900 (FIG. 9A), each distinct part of the concatenation is a base hash code so that comparing the two large concatenation hash codes aligns the source and reference base hash codes for the same relative base block positions within the current and reference block. Thus, it is immediately known which base hash codes matched and which did not. With this knowledge, and by grouping the relative locations of the base blocks of the matched hash codes, it can be determined which prediction blocks have matching hash codes and should be predictions. This also is repeated for each reference block position on the reference frame.

The process 500 may include "set matched block location with at least size and motion vector as a hash-based intra-prediction candidate" 558. By one option, the blocks actually may be tracked by motion vector. Specifically, before or after a match is determined, a potential motion vector is set from the anchor pixel location of the current block (or source prediction block) to the anchor pixel location of the reference bock (or reference prediction block). By one form, the block positions being compared may be selected by potential motion vectors defining the locations. By another option, the motion vectors may be determined once a hash code match is determined, and the motion vector indicates the position of the matching blocks as a candidate motion vector. With these operations then, and once a hash match is determined, the motion vector and size of the block may be saved as the candidate information. Otherwise, the motion vector and block size may be used to form a residual when prediction mode selection is automatically omitted when hash matches are present. In either case, and by one form, the prediction information, such as the motion vector and block size, may be packed into a bitstream and transmitted to decoders without the need for any other hash information of the prediction.

Such arrangements result in a hash-based search method that reduces power consumption since the method need only perform reference table creation once for the frame, and then the method only needs to perform a single reference base hash code look-up operation for each of the source base blocks and at each reference block location, rather than for each different prediction block size and position.

Other encoder parameters may be adjusted as well depending on the base block hash code matches. Thus, the process 500 may include the inquiry "hash match?" 560, and this test may be applied to each current block after all or certain individual reference block positions on the reference frame have been compared to the current block. If no hash-based match exists for the current block, then the current block is encoded without hash-based IBC 562. In this case, normal motion search IBC, non-IBC intra prediction, and/or inter-prediction may be applied for the current block as set by the encoder parameters and controls.

By one alternative when hash codes do match, the process 500 then may include the inquiry "hash flat region?" 564, and this may be applied for each prediction block and/or current block with matching hash codes as tracked by the region id count (operation 520) described above. Thus, this first may include looking up the reference base hash codes or reference base block locations of a current or prediction block with matching hash codes. The look-up is performed in the reference hash table or separate table to see if the uniform region count is non-zero. If so, this operation then may include a test to determine whether or not the block being analyzed is actually in a repeating pattern of image content rather than a uniform region. This may be accomplished by applying a gradient-based pattern detection technique to pixel values across multiple base blocks for example, such as with Sobel edge detection that can detect edges over some threshold minimum area. Then those areas can be compared with other regions to detect a pattern. When no pattern exists and a uniform region is confirmed, the process 500 can adjust encoder parameters to increase quality and/or performance starting in operation 568.

Also as mentioned above, a base block may be designated to be within a uniform region when a prior frame has a uniform region for the same base block location and even though the current frame does not indicate the base block is in a uniform region. By one approach, this is determined as the region counts are being generated and this prior frame consideration already is factored into the region count stored in the tables described above. By another approach, however, the prior frame is considered later and separately. In this case, when it is determined one or more base blocks within the current or prediction block with matching hash codes is not in a uniform region due to the stored count, the process 500 may include "hash temporal common entry?" 566. At this point, the prior frame is checked for a uniform region (or temporal common entry) at the base blocks being analyzed by looking at the region counts of the prior frame. If such a region or common exists, then the hash codes are checked. If one or more of the base hash codes of the base block(s) on the current frame are the same as one or more of the hash codes of the correspondingly located base blocks of the region of the prior frame, then the reference base blocks, and in turn current block's or prediction block's base blocks, on the current frame then still may be considered to be within a uniform region, and the prediction block or current block is treated as being in the uniform region. When no flat region and no common entry exists, the process proceeds to operation 570 below to adjust prediction modes when desired.

When a uniform region or temporal common entry is detected for a current or prediction block being analyzed, then the process 500 may include "adjust block QP" 568. For this operation, the pre-indexed information for which regions are uniform and dominant may be used to improve quality and speed up the encoding tasks. As the method checks the hash code of the source or current block checks its hash value, if it finds it matches a region that is frequently found in the image, the current block or prediction block can be assigned a lower quantization parameter (QP) value to raise the quality of the block. Since the block is within a region with frequently repeating image data, the high quality block very well may be copied to other regions, thereby raising the quality of those regions as well. It should be noted that the encoder can compensate for the increase in bits generated by raising the quality of the blocks. Specifically, the additional bits generated by reducing the QP to improve quality for the first block will result in fewer bits needed for the future IBC references of the same block as well as future frames that may refer back to the uniform regions, and due to the detection of the uniform regions. In this case, an encoder control may adjust the QP by decreasing the QP relative to the amount the block will be referenced when a uniform region is detected. A block that will be a reference by half the frame could get a much lower QP than a block that will be referenced by just four or five other blocks.

Whether or not a current block or prediction block has been found to be in a uniform region, the process 500 may continue with "change which prediction mode candidate type(s) are being considered for prediction" 570. As mentioned above, in one option, the hash-based search candidate, when established, is used as the prediction without other candidate prediction consideration and prediction mode selection. However, by another approach, when hash code matches were found in current and prediction blocks that are not uniform, or uniformity of region was not considered, an intra motion search for IBC can use matched blocks as a starting location to perform a local search rather than a larger full search. Otherwise, by another option, the amount or type of prediction modes that are considered candidates can be disabled when a hash-based search candidate is present. Thus, for example, the quality of the blocks can be improved by finding candidates that might not appear through the normal non-IBC intra and inter prediction modes such as spatial neighbors and hierarchical motion estimation (HME) searching such that these prediction methods could be disabled with the presence of a hash-based prediction.

When the prediction or current block is in a uniform region, prediction modes in addition to the hash-based search modes can be candidate prediction modes that result in a higher rate of distortion. The higher the rate of distortion, the lower the quality but also the higher the number of bits to compute. Specifically, when a region is substantially or entirely uniform, the tradeoff of different prediction modes by factoring uniformity to choose the intra mode options can take this into account to select a mode to give more uniformity to the region and thus improve quality of the block. For instance, normally a horizontal intra prediction mode would provide a lower rate distortion and would normally be selected given a current bit cost. But knowing a region of an image is uniform, a DC intra prediction mode could be used even if it takes a high number of bits to use a coefficient to correct the DC bias and even though the result may be a higher rate distortion (RD) value. Future references to this uniform block will then be more accurate and less likely to have subjective artifacts.

By other options, the available prediction modes also can be reduced due to the uniform regions. Once it is determined that a current or prediction block is in a uniform region, certain prediction modes that will be a bad fit in such a region can be disabled. This may include palette or intra-sub-partition modes that can take a considerable amount of compute. Disabling such prediction modes in favor of the relatively quickly calculated hash codes and comparisons can improve the overall performance.

Optionally, the process 500 also may include "detect scene change" 572. Here, when it is determined some threshold number of base blocks are no longer in a region relative to the regions in a prior frame, then it is concluded that a new scene is detected. Once a new scene is detected, the encoder may start a new GOP, adjust the frame type (such as making a non-reference B frame a referenced B frame), and/or adjust the QP. By another option, any hash-based IBC that references prior frames may be disabled as well since image data exists that remains the same from frame to frame.

The process 500 may include "store neighbor pixels" 574. Here, in addition to the QP and/or prediction mode adjustments, with the detection of the uniform regions, the encoder has an improved ability to predict which neighbor pixel image data will be needed soon to reconstruct blocks of image data on the current frame, and can store that image data for relatively immediate use. Particularly, the encoder usually must wait for the image data of neighbor pixels to be decoded and/or fetched in order to decode a current pixel. The neighbors are typically in the row above or to the left of the current pixel. Thus, when a block is intra block copied, a pipeline for the intra-prediction can stall while waiting for the neighbor pixels to be fetched. Since the encoder knows which pixel locations are in a uniform region and that these pixel locations are going to be copied several times with the same image data, the encoder can store the neighbor pixels values of the region ahead of time where it is accessible for quicker access to avoid slowing the pipeline, such as internal on-board RAM or cache for example versus external RAM. The neighbor pixels also can be pre-fetched once a hash is computed which is a performance improvement in itself since normally a final mode decision would be made which will then need to go through transform, quantization, inverse quantization and inverse transform before the neighbor pixels are ready to generate residual pixels for neighbor prediction for example. This can occur since it is known that a uniform region exists and IBC will be selected for that uniform region which has the same reconstruction.

After, or while encoder parameters and prediction modes are being used as described above to reconstruct current or prediction blocks, and whether or not the encoder detected matching hash codes and/or uniform regions on the previous current or source block, the process 500 next may include the inquiry "more source blocks?" 576. The encoder then checks to see if any source blocks are yet to be decoded on the current frame. If not, the process ends for the current frame, and the next frame may be analyzed repeating process 500 until all or individual frames with intra coding are analyzed.

If more source (or current) blocks are on the current frame that have not been decoded yet, the process 500 may include "obtain next current source block location" 578 which may include obtaining the image data of the next source block as well. The source blocks can be generally obtained by raster scan order, large partitions such as slices, tiles, or segments, or any other logical order.

The process 500 then may include "update reference frame on reference hash table" 580, where the reference hash table or list is updated with the computed reference base hash codes, and the location of those base blocks when used, of the current block just reconstructed. This operation is performed when the reference frame as represented by the reference hash table or list only holds the base hash codes of already reconstructed source blocks. When entire frames, such hash codes already may be in the reference hash table, and in this case, an indicator may be turned to "decoded" for individual entries when such updating is needed. The process then loops back to operation 532 to analyze the next source (or current) block.

Turning to another alternative, the pre-processing 504 may include operations to apply the hash-based search IBC disclosed herein to natural camera-captured video so that process 500 can be applied to natural images. Specifically, normally the hash based search method for intra block copy is reserved for screen content since natural content tends to have small variations (such as white noise) due to small variations in camera sensors. The noise makes it unlikely that hash code matches can be found when matches should exist, and therefore, an exact match from frame to frame, or within a frame, for an entire block is unlikely. However, it is desirable to apply the hash based search to natural video to increase quality and improve performance by repurposing the hash based search method or pipeline herein to increase the speed of prediction mode decisions on natural content.

To apply the hash-based searches to natural content, pre-processing operations specifically for hash-based searches can be performed to make detected hash code matches more likely. This includes a combination of denoising, down-sampling, and downsizing applied to pixel image data of the current frame before hash matching operations are performed.

For example, after the encoder's pre-processing unit applies a general first denoising to input frames, a second IBC denoising operation may be applied to the current frame when IBC is to be applied to the frame. Otherwise, the second denoising could be applied to all frames in case IBC is to be applied. The IBC denoising may apply techniques such as detecting edges and forcing pixels to a uniform value that is not located along the edge to improve IBC matching. This may or may not be the same technique as used with the general first denoising. Repeating the same denoising algorithms again will remove more noise. Also, by one form, the first general denoising may be adequate so that a second IBC denoising can be omitted. In this case, the first general denoising should use a standard white noise removal technique.

Down-sampling refers to removing a certain number of least significant bits (LSBs), such as four to reduce the bit length of the chroma and luminance image data, and by one example, from 10 bpp (bits per pixel) to 6 bpp by removing the four right digits of the 10 bit values. This will have the effect of rounding or scaling +/−16 by reducing a possible 1024 values down to 64 values. This significantly increases the chance of finding a potential match based on matching image values used to form the hash codes.

In addition, the rounding caused by the down-sampling results in the removal of subtle small noise gradients from pixel to pixel thereby acting to form local, more uniform regions on the image. Thus, the rounding acts as additional denoising since the rounding inherently takes into account a probability that a gradient is part of the image content versus noise. As a result, each block will have these subtle small gradients removed to form a smoother higher quality image and facilitate matching.

Downsizing may refer to sampling the image data every horizontal and/or vertical interval in the current image, such as every other pixel. By one example, the downsizing may be a sampling of two reducing the image size by a factor of two horizontally and vertically. Otherwise, combination techniques such as averaging may be used. Specifically, bilinear and bicubic techniques may be used to name a few examples.

The three operations: denoising, downsampling, and downsizing (DDD), may be performed in any order that is found to be efficient, and any one or combination of the operations may be performed instead of all three when desired. Also, by this approach, the modified image data only will be used for hash matching while the final prediction mode decision still will use the full original or reconstructed pixel values to form the predictions of the blocks with matching hash codes.

In addition to enabling the encoder to apply hash-based search IBC to natural video, further benefits of the DDD operations is to enable the encoder to better select prediction modes for a current or prediction block to increase performance and quality of the images. For example, the down-sampling may result in larger uniform regions due to the rounding mentioned above, and this can be tracked by the counting operations mentioned above with process 500 to track these regions on the reference frame. In this case, the encoder may repurpose the hash pipeline to improve performance and quality by disabling integer searches for natural video, and other compression search methods (such as searching for smaller block sizes), and that are unlikely to be the final selected prediction at the uniform regions of the reference frame. The encoder may further improve the quality of the uniform regions of the natural video by reducing the QP for these uniform regions when referenced frequently, as may be set by a threshold, and as mentioned above with the QP adjustment of the screen content video.

While any implementation of the example processes or systems herein may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
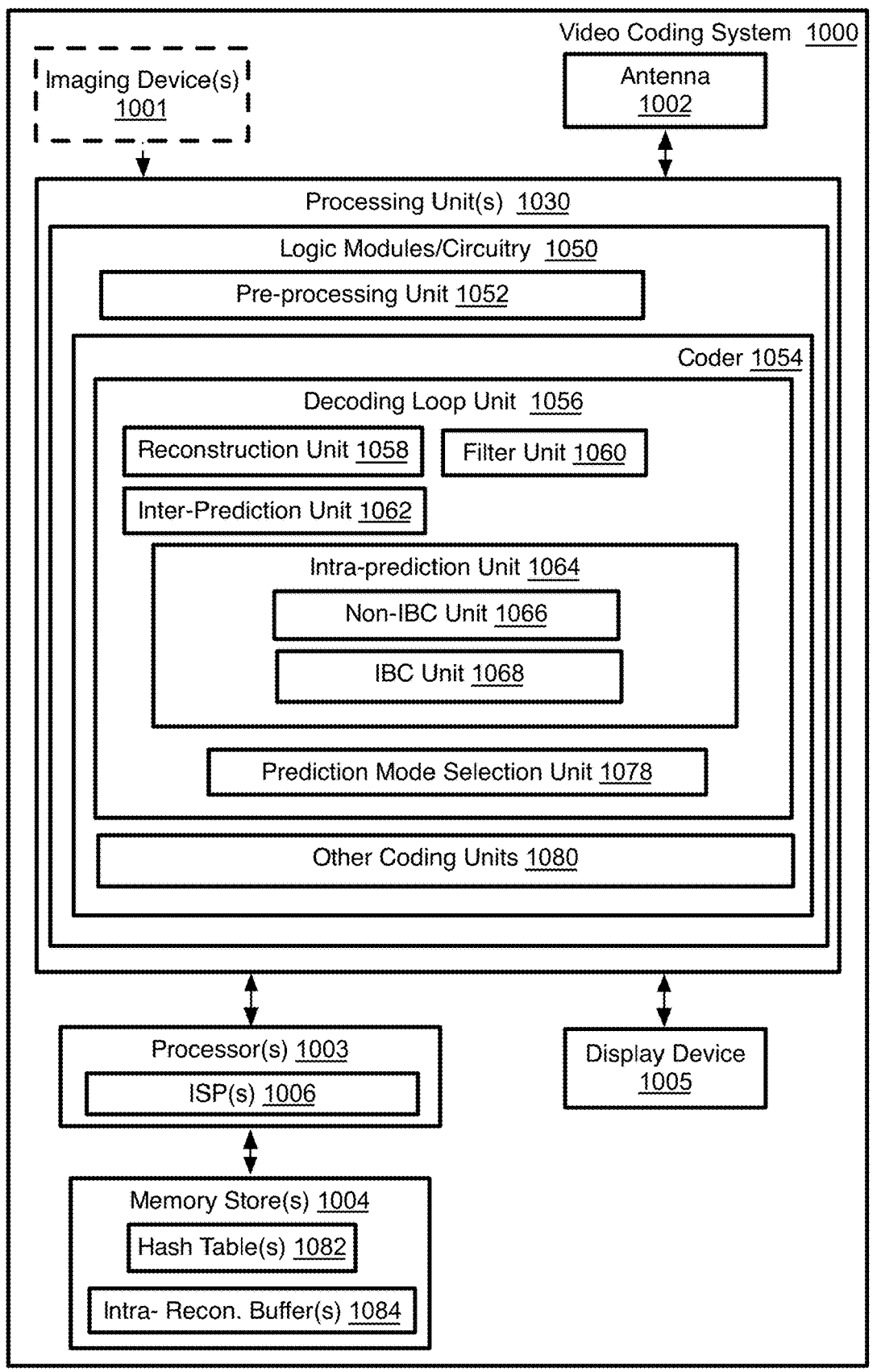
FIG. 10 is an illustrative diagram of an example system.

Referring to FIG. 10, an example image processing system (or video coding system) 1000 for providing video coding with intra block copying may be arranged in accordance with at least some implementations of the present disclosure. In the illustrated implementation, system 1000 may include one or more processor(s) 1003, processing unit(s) 1030 to provide the encoder and decoder discussed herein, optionally one or more imaging devices 1001 to capture images, an antenna 1002 to receive or transmit image data, a display device 1005, and one or more memory stores 1004. Processor(s) 1003, memory store 1004, and/or display device 1005 may be capable of communication with one another, via, for example, a bus, wires, or other access. In various implementations, display device 1005 may be integrated in system 1000 or implemented separately from system 1000.

As shown in FIG. 10, and discussed above, the processing unit(s) 1030 may have logic modules or circuitry 1050 with a pre-processing unit 1052 that modifies image data for coding, and a coder 1054 that could be or include an encoder 200. Relevant here, the coder 1054 may have a decoding loop unit 1056 with a reconstruction unit 1058 to reconstruct transformed and quantized image data, a filter unit 1060 to refine the reconstructed image data, an inter-prediction unit 1062, and an intra-prediction unit 1064. The intra-prediction unit 1064, the same or similar to intra predictor unit 224 (FIG. 2), may have a non-IBC unit 1066 that generates spatial prediction candidates, such as horizontal or DC, for intra-prediction modes, and an IBC unit 1068 that performs both IBC motion searching for intra prediction and much of the hash-based searching IBC operations disclosed herein and described above. A prediction mode selection unit 1078 may select the prediction mode that is used to generate a residual to modify the original data and for compression. The coder 1054 also may have other coding units 1080 which may include video coding units not mentioned including any or all of the other units of the encoder 200 described above for example. All of these perform the tasks as described in detail above and as the title of the unit or module suggests.

As will be appreciated, the modules illustrated in FIG. 10 may include a variety of software and/or hardware modules and/or modules that may be implemented via software or hardware or combinations thereof. For example, the modules may be implemented as software via processing units 1030 or the modules may be implemented via a dedicated hardware portion. Also, system 1000 may be implemented in a variety of ways. For example, system 1000 (excluding display device 1005) may be implemented as a single chip or device having an accelerator or a graphics processor unit (GPU) which may or may not have image signal processors (ISPs), a quad-core central processing unit, and/or a memory controller input/output (I/O) module. In other examples, system 1000 (again excluding display device 1005) may be implemented as a chipset or a system on a chip (SoC). It will be understood antenna 1002 could be used to receive image data for encoding as well.

Otherwise, processor(s) 1003 may include any suitable implementation including, for example, central processing units (CPUs), microprocessor(s), multicore processors, application specific integrated circuits, chip(s), chipsets, programmable logic devices, graphics cards, integrated graphics, general purpose graphics processing unit(s), fixed function GPUs such as image signal processors (ISPs) 1006, digital signal processor(s) (DSPs), and so forth, SoCs, other accelerators, or the like.

In addition, memory stores 1004 may store the hash table(s) 1082 as described above and may have intra-reconstructed buffers 1084 to store either a version of original image data or reconstructed image data to form the reference frame and/or source blocks on the current frame if needed and that can be used to reconstruct the image blocks of a frame depending on the hash matches. The memory stores 1004 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1004 also may be implemented via cache memory.

In various implementations, the example video coding system 1000 may use the imaging device 1001 to form or receive natural captured image data. The system 1000 may receive screen content through the camera, antenna 1002, or other wired connection. The camera can be implemented in various ways. Thus, in one form, the image processing system 1000 may be one or more digital cameras or other image capture devices, and imaging device 1001, in this case, may be the camera hardware and camera sensor software, module, or component. In other examples, video coding system 1000 may have an imaging device 1001 that includes or may be one or more cameras, and logic modules 1050 may communicate remotely with, or otherwise may be communicatively coupled to, the imaging device 1001 for further processing of the image data.

Thus, video coding system 1000 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 1001 may include camera hardware and optics including one or more sensors as well as auto-focus, zoom, aperture, ND-filter, auto-exposure, flash, and actuator controls. The imaging device 1001 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1001 may be provided with an eye tracking camera. Otherwise, the imaging device 1001 may be any other device that records, displays or processes digital images such as video game panels or consoles, set top boxes, and so forth.

As illustrated, any of these components may be capable of communication with one another and/or communication with portions of logic modules 1050 and/or imaging device 1001. Thus, processors 1003 may be communicatively coupled to both the image device 1001 and the logic modules 1050 for operating those components. Although image processing system 1000, as shown in FIG. 10, may include one particular set of blocks or actions associated with particular components or modules, these blocks or actions may be associated with different components or modules than the particular component or module illustrated here.

Figure 11:
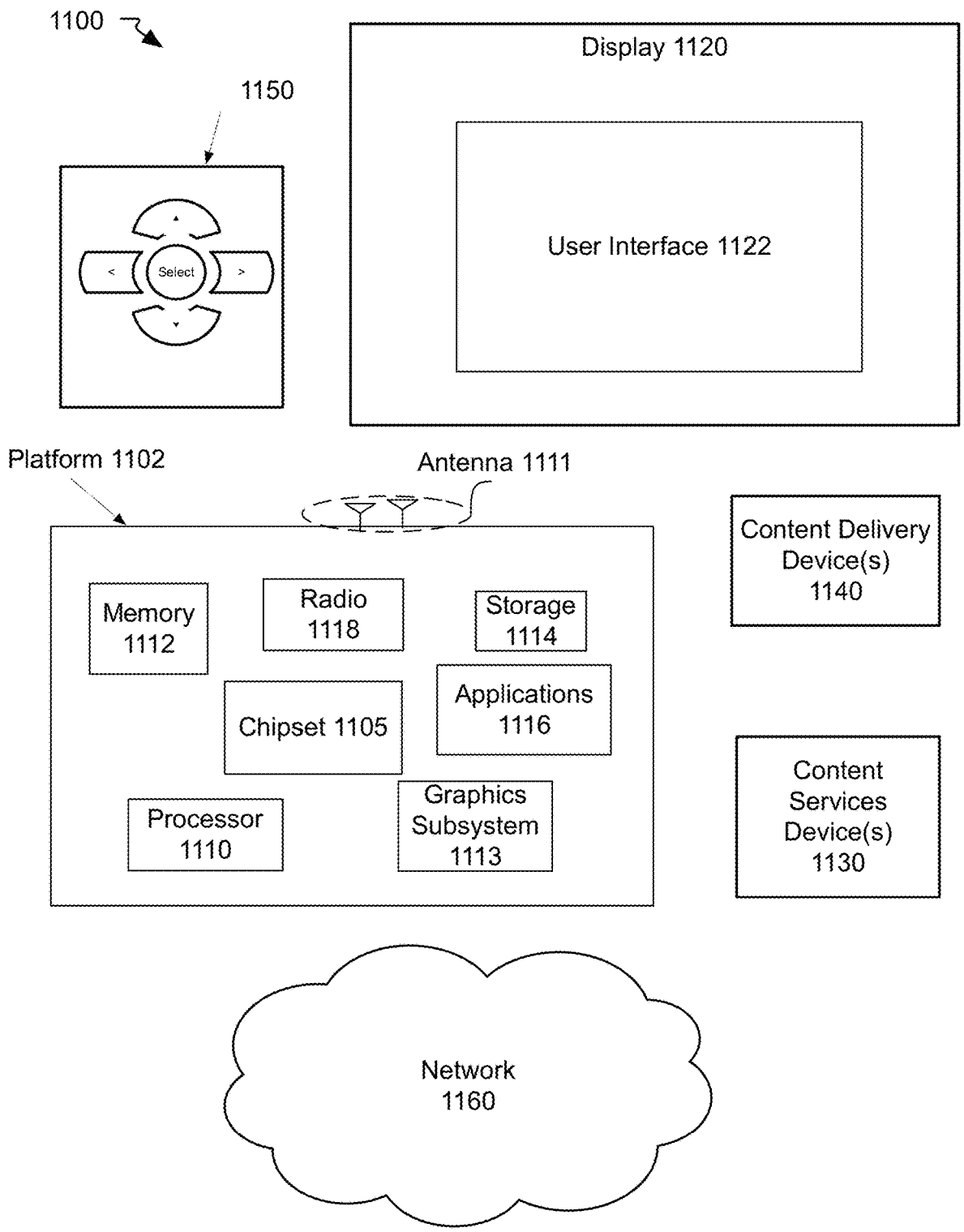
FIG. 11 is an illustrative diagram of another example system.

Referring to FIG. 11, an example system 1100 in accordance with the present disclosure and various implementations may embody system 1000 for example. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet. Smart speaker, or smart television), mobile internet device (MID), messaging device, data communication device, and so forth.

In various implementations, system 1100 includes a platform 1102 communicatively coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1113, applications 1116 and/or radio 1118 as well as antenna(s) 1111. Chipset 1105 may provide intercommunication among processor 1110, memory 1112, storage 1114, graphics subsystem 1113, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1113 may perform processing of images such as still or video for display. Graphics subsystem 1113 may be a graphics processing unit (GPU) or a visual processing unit (VPU), for example. An analog or digital interface may be used to communicatively couple graphics subsystem 1113 and display 1120. For example, the interface may be any of a High-Definition Multimedia Interface, Display Port, wireless HDMI, and/or wireless HD compliant techniques. Graphics subsystem 1113 may be integrated into processor 1110 or chipset 1105. In some implementations, graphics subsystem 1113 may be a stand-alone card communicatively coupled to chipset 1105.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
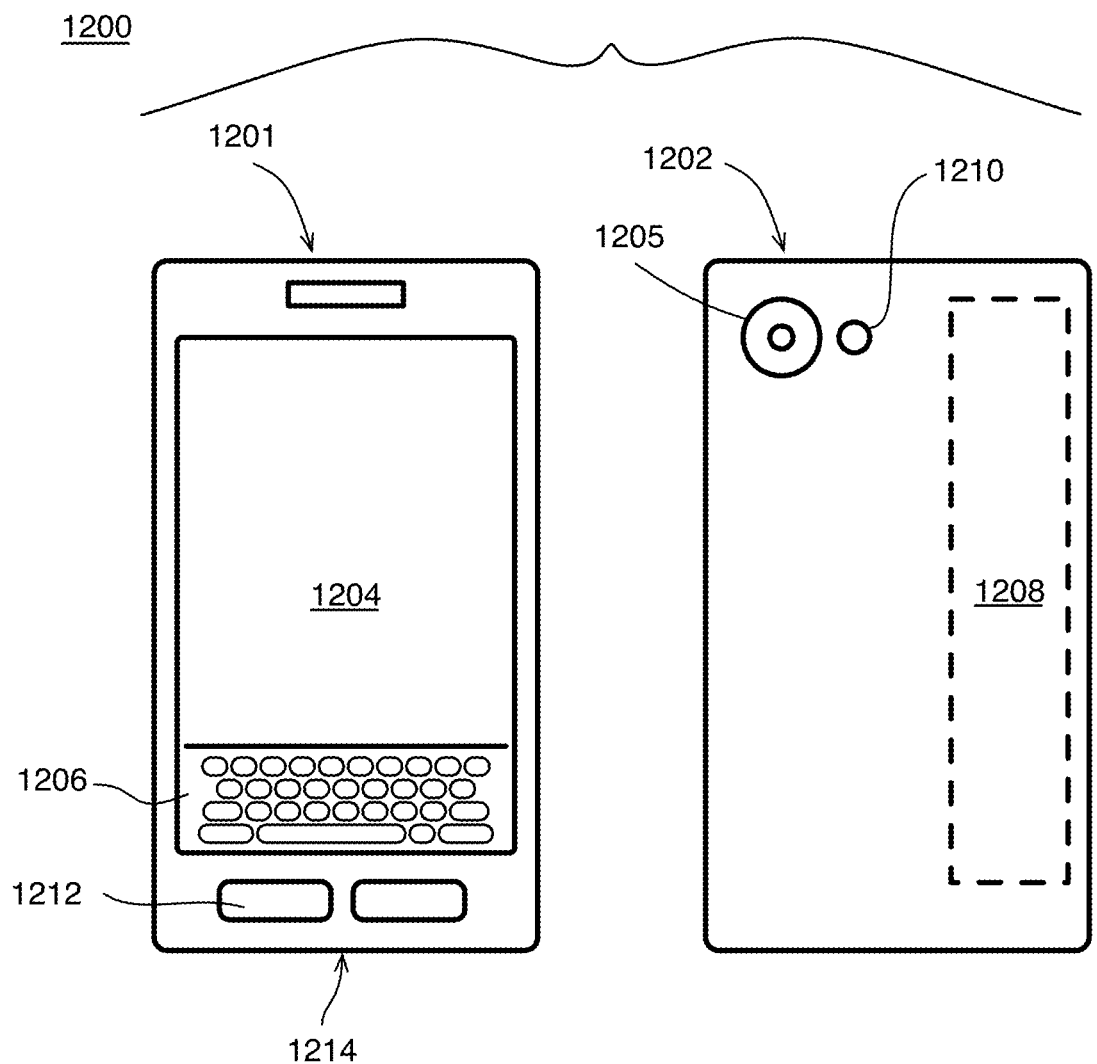
FIG. 12 illustrates another example device, all arranged in accordance with at least some implementations of the present disclosure.

Referring to FIG. 12, a small form factor device 1200 is one example of the varying physical styles or form factors in which systems 1100 or 1000 may be embodied. By this approach, device 1200 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone 1214, or may be digitized by a voice recognition device. As shown, device 1200 may include a camera 1205 (e.g., including at least one lens, aperture, and imaging sensor) and a flash 1210 integrated into back 1202 (or elsewhere) of device 1200. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the p resent disclosure pertains are deemed to lie within the spirit and scope of the present disclosure.

The following examples pertain to additional implementations.

By an example one or more first implementations, a computer-implemented method of video coding comprises obtaining image data of at least one frame of a video sequence; generating reference base hash codes each associated with a reference base block that is a base block size of image data on the at least one frame; generating source base hash codes each associated with a source base block that is the base block size of image data on the at least one frame; determining source base hash codes of a current block of the at least one frame to be reconstructed depending on which of the source base blocks of the at least one frame are disposed within the current block, wherein the current block is larger than the base block size; and determining at least one prediction of the current block or a prediction block within the current block depending on whether at least one match exists between one of the reference base hash codes and one of the source base hash codes of the current block.

By one or more second implementation, and further to the first implementation, wherein the reference base hash codes and the source base hash codes are both formed by using a version of original pixel image data rather than encoder reconstructed image data.

By one or more third implementations, and further to the first or second implementation, wherein the current block has a large size that includes a plurality of available prediction block sizes within the current block; and the method comprises setting at least one of the available prediction block sizes to be the prediction block of the prediction when all of the source base blocks within the prediction block have a matching source base hash code with one of the reference base hash codes of the reference base blocks.

By one or more fourth implementations, and further to any of the first to third implementation, wherein the method comprising concatenating the source base hash codes of the source base blocks forming the current block; concatenating reference base hash codes of reference base blocks that cooperatively form the same size as the current block; and determining whether the entire concatenated reference and source hash codes match for multiple different potential concatenated reference hash codes.

By one or more fifth implementations, and further to any of the first to third implementation, wherein the method comprising: concatenating the source base hash codes of the source base blocks forming the current block; concatenating reference base hash codes of reference base blocks that cooperatively form the same size as the current block; determining whether the entire concatenated reference and source hash codes match for multiple different potential concatenated reference hash codes; and determining whether parts of the concatenated reference and source hash codes match and that correspond to matching reference and source base hash codes that each fills a prediction block.

By one or more sixth implementations, and further to any of the first to fifth implementation, wherein the method comprising concatenating the source base hash codes of the source base blocks forming at least one prediction block within the current block; concatenating reference base hash codes of reference base blocks that cooperatively form the same size block as the prediction block; and determining whether the entire concatenated reference and source hash codes match for multiple different potential concatenated reference hash codes of the prediction block.

By one or more seventh implementations, and further to any of the first to sixth implementation, wherein the method comprising listing the reference base hash codes on a table, and looking up source base hash codes of the current block on the table to determine whether any reference base hash codes are the same as the source base hash code to establish a match between the source base hash code and a reference base hash code.

By one or more eighth implementations, and further to any of the first to sixth implementation, wherein the method comprising listing the reference base hash codes on a table, and looking up source base hash codes of the current block on the table to determine whether any reference base hash codes are the same as the source base hash code to establish a match between the source base hash code and a reference base hash code, wherein the table lists at least the reference base hash code and an anchor pixel location of the reference base block of the reference base hash code.

By one or more ninth implementations, and further to any of the first to eighth implementation, wherein the method comprising generating the source base hash codes on the fly to match to reference base hash codes without storing the source base hash codes in a buffer.

By one or more tenth implementations, and further to any of the first to ninth implementation, wherein the method comprising generating the source base hash codes comprising dividing the frame into non-overlapping source base blocks each being disposed in a position to potentially be, or form part of, an intra-prediction block of a prediction.

By one or more eleventh implementations, and further to any of the first to tenth implementation, wherein the method comprising generating reference base hash codes of reference base blocks at individual anchor pixel locations so that reference base blocks have overlapping positions on the frame.

By one or more twelfth implementations, and further to any of the first to eleventh implementation, wherein the method comprising generating the prediction to be image data of the reference base blocks forming the current block or prediction block when the current block or prediction block have matching reference and source base hash codes.

By an example one or more thirteenth implementation, a computer-implemented system comprises at least one display; memory to store image data of at least one image; at least one processor communicatively coupled to the memory and display, and the at least one processor being arranged to operate by: obtaining image data of at least one frame of a video sequence; generating reference base hash codes each associated with a reference base block that is a base block size of image data on the at least one frame; generating source base hash codes each associated with a source base block that is the base block size of image data on the at least one frame; determining source base hash codes of a current block of the at least one frame to be reconstructed depending on which of the source base blocks of the at least one frame are disposed within the current block, wherein the current block is larger than the base block size; and determining at least one prediction of the current block or a prediction block within the current block depending on whether at least one match exists between one of the reference base hash codes and one of the source base hash codes of the current block.

By one or more fourteenth implementations, and further to the thirteenth implementation, wherein the at least one processor is arranged to operate by detecting at least one uniform region comprising generating indicators that reference or source base blocks are considered to be located in a uniform region of the frame depending on whether one or more neighbor base blocks relative to a current base block has the same base hash code.

By one or more fifteenth implementations, and further to the thirteenth implementation, wherein the at least one processor is arranged to operate by detecting at least one uniform region comprising generating indicators that reference or source base blocks are considered to be located in a uniform region of the frame depending on whether one or more neighbor base blocks relative to a current base block has the same base hash code, and wherein the at least one processor is arranged to operate by maintaining at least a count of a number of base blocks and location of base blocks that have the same base hash code to track the position of the uniform regions.

By one or more sixteenth implementations, and further to the thirteenth implementation, wherein the at least one processor is arranged to operate by detecting at least one uniform region comprising generating indicators that reference or source base blocks are considered to be located in a uniform region of the frame depending on whether one or more neighbor base blocks relative to a current base block has the same base hash code, and wherein the at least one frame is a current frame, and wherein the at least one processor is arranged to operate by indicating a current base block on the current frame is within a uniform region when a same base block location on a previous frame relative to the current frame was determined to be in a uniform region and has the same base hash code as the current base block.

By one or more seventeenth implementations, and further to any of the thirteenth to sixteenth implementation, wherein the at least one processor is arranged to operate by detecting at least one uniform region comprising generating indicators that reference or source base blocks are considered to be located in a uniform region of the frame depending on whether one or more neighbor base blocks relative to a current base block has the same base hash code, and wherein the at least one processor is arranged to operate by, when the current block or prediction block is found to be in a uniform region, at least one of: (a) lowering a quantization parameter of the current block or prediction block, (b) changing which prediction modes are to be considered for the current block or prediction block, and (c) detecting a scene change when a predetermined sufficient number of base blocks in a uniform region has a different hash code than the same base block pixel location on a previous frame.

By an example one or more eighteenth implementations, at least one non-transitory computer-readable medium having instructions stored thereon that when executed cause a computing device to operate by: obtaining image data of at least one frame of a video sequence; generating reference base hash codes each associated with a reference base block that is a base block size of image data on the at least one frame; generating source base hash codes each associated with a source base block that is the base block size of image data on the at least one frame; determining source base hash codes of a current block of the at least one frame to be reconstructed depending on which of the source base blocks of the at least one frame are disposed within the current block, wherein the current block is larger than the base block size; and determining at least one prediction of the current block or a prediction block within the current block depending on whether at least one match exists between one of the reference base hash codes and one of the source base hash codes of the current block.

By one or more nineteenth implementations, and further to the eighteenth implementation, the original image data is video recorded by a camera; and wherein the instructions are arranged to cause the computing device to operate by modifying image data to be used to generate the reference and source base hash codes to increase the probability of finding matching reference and source base hash codes.

By one or more twentieth implementations, and further to the eighteenth implementation, the original image data is video recorded by a camera; and wherein the instructions are arranged to cause the computing device to operate by modifying image data to be used to generate the reference and source base hash codes to increase the probability of finding matching reference and source base hash codes, and wherein the instructions are arranged to cause the computing device to operate by using the modified image data only to compute the reference and source hash codes rather than as the image data of the prediction.

By one or more twenty-first implementations, and further to any of the eighteenth to twentieth implementation, wherein the instructions are arranged to cause the computing device to operate by de-noising the image data of the frame before using the image data to generate the reference and source base hash codes, and regardless of any other de-noising already performed as pre-processing of an encoder generating the reference and source base hash codes.

By one or more twenty-second implementations, and further to any of the eighteenth to twenty-first implementation, wherein the instructions are arranged to cause the computing device to operate by downsizing the image data of the frame before generating the reference and source base hash codes.

By one or more twenty-third implementations, and further to any of the eighteenth to twenty-second implementation, wherein the instructions are arranged to cause the computing device to operate by down-sampling the image data to be used to generate the reference and source base hash codes comprising dropping one or more least significant bits (LSBs) to round image data values forming the image data.

By one or more twenty-fourth implementations, and further to any of the eighteenth to twenty-third implementation, wherein the prediction is a hash-based search prediction, and wherein the instructions are arranged to cause the computing device to operate by changing which other intra-prediction modes are to be considered for a current block or prediction block within the current block when matching hash codes are found at the current block or prediction block.

By one or more twenty-fifth implementations, and further to any of the eighteenth to twenty-fourth implementation, wherein the instructions are arranged to cause the computing device to operate by using the prediction as a start location for an intra-prediction block-matching search.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:
1. A computer-implemented method of video coding, comprising:
   obtaining image data of at least one frame of a video sequence;
   generating reference base hash codes each associated with a reference base block that is a base block size of image data on the at least one frame;
   generating source base hash codes each associated with a source base block that is the base block size of image data on the at least one frame;

determining source base hash codes of a current block of the at least one frame to be reconstructed depending on which of the source base blocks of the at least one frame are disposed within the current block, wherein the current block is larger than the base block size and includes a plurality of available prediction block sizes within the current block;

determining which available prediction block sizes in the current block have all source base blocks within the prediction block size matched with reference base blocks; and providing a prediction block of the current block for each prediction size of the current block with all source base blocks matched.

2. The method of claim 1 comprising: concatenating the source base hash codes of the source base blocks forming the current block; concatenating reference base hash codes of reference base blocks that cooperatively form the same size as the current block; and determining whether the entire concatenated reference and source hash codes match for multiple different potential concatenated reference hash codes.

3. The method of claim 2 comprising determining whether parts of the concatenated reference and source hash codes match and that correspond to matching reference and source base hash codes that each fills a prediction block.

4. The method of claim 1 comprising concatenating the source base hash codes of the source base blocks forming at least one prediction block within the current block; concatenating reference base hash codes of reference base blocks that cooperatively form the same size block as the prediction block; and determining whether the entire concatenated reference and source hash codes match for multiple different potential concatenated reference hash codes of the prediction block.

5. The method of claim 1 comprising listing the reference base hash codes on a table, and looking up source base hash codes of the current block on the table to determine whether any reference base hash codes are the same as the source base hash code to establish a match between the source base hash code and a reference base hash code.

6. The method of claim 5 wherein the table lists at least the reference base hash code and an anchor pixel location of the reference base block of the reference base hash code.

7. The method of claim 1 comprising generating the source base hash codes on the fly to match to reference base hash codes without storing the source base hash codes in a buffer.

8. The method of claim 1 comprising generating the source base hash codes comprising dividing the frame into non-overlapping source base blocks each being disposed in a position to potentially be, or form part of, an intra-prediction block of a prediction.

9. The method of claim 1 comprising generating reference base hash codes of reference base blocks at individual anchor pixel locations so that reference base blocks have overlapping positions on the frame.

10. The method of claim 1 comprising generating the prediction to be image data of the reference base blocks forming the current block or prediction block when the current block or prediction block have matching reference and source base hash codes.

11. A computer-implemented system comprising:
at least one display;
memory to store image data of at least one image;
at least one processor communicatively coupled to the memory and display, and the at least one processor being arranged to operate by:
obtaining image data of at least one frame of a video sequence;
generating reference base hash codes each associated with a reference base block that is a base block size of image data on the at least one frame;
generating source base hash codes each associated with a source base block that is the base block size of image data on the at least one frame;
determining source base hash codes of a current block of the at least one frame to be reconstructed depending on which of the source base blocks of the at least one frame are disposed within the current block, wherein the current block is larger than the base block size and includes a plurality of available prediction block sizes within the current block;
determining which available prediction block sizes in the current block have all source base blocks within the prediction block size matched with reference base blocks; and
providing a prediction block of the current block for each prediction size of the current block with all source base blocks matched.

12. At least one non-transitory computer-readable medium having instructions stored thereon that when executed cause a computing device to operate by:
obtaining image data of at least one frame of a video sequence;
generating reference base hash codes each associated with a reference base block that is a base block size of image data on the at least one frame;
generating source base hash codes each associated with a source base block that is the base block size of image data on the at least one frame;
determining source base hash codes of a current block of the at least one frame to be reconstructed depending on which of the source base blocks of the at least one frame are disposed within the current block, wherein the current block is larger than the base block size and includes a plurality of available prediction block sizes within the current block;
determining which available prediction block sizes in the current block have all source base blocks within the prediction block size matched with reference base blocks; and
providing a prediction block of the current block for each prediction size of the current block with all source base blocks matched.

13. The medium of claim 12 wherein the prediction is a hash-based search prediction, and wherein the instructions are arranged to cause the computing device to operate by changing which other intra-prediction modes are to be considered for a current block or prediction block within the current block when matching hash codes are found at the current block or prediction block.

14. The medium of claim 12 wherein the instructions are arranged to cause the computing device to operate by using the prediction as a start location for an intra-prediction block-matching search.

* * * * *